(12) United States Patent
Devreese et al.

(10) Patent No.: US 11,273,701 B2
(45) Date of Patent: Mar. 15, 2022

(54) ELECTRIC DRIVE AXLE POWERPATH AND THE DRIVE AXLE MADE THEREWITH

(71) Applicant: DANA HEAVY VEHICLE SYSTEMS GROUP, LLC, Maumee, OH (US)

(72) Inventors: Thibault G. Devreese, Ghent (BE); Wouter W. A. Galoppin, Kampenhout (BE)

(73) Assignee: Dana Heavy Vehicle Systems Group, LLC, Maumee, OH (US)

(*) Notice: Subject to any disclaimer, the term of this patent is extended or adjusted under 35 U.S.C. 154(b) by 413 days.

(21) Appl. No.: 16/328,388

(22) PCT Filed: Aug. 30, 2017

(86) PCT No.: PCT/US2017/049369
§ 371 (c)(1),
(2) Date: Feb. 26, 2019

(87) PCT Pub. No.: WO2018/045027
PCT Pub. Date: Mar. 8, 2018

(65) Prior Publication Data
US 2021/0276409 A1    Sep. 9, 2021

Related U.S. Application Data

(60) Provisional application No. 62/381,218, filed on Aug. 30, 2016, provisional application No. 62/513,150, filed on May 31, 2017.

(51) Int. Cl.
*B60K 1/04*    (2019.01)
*B60K 7/00*    (2006.01)
(Continued)

(52) U.S. Cl.
CPC .............. *B60K 7/0007* (2013.01); *B60K 1/00* (2013.01); *B60K 17/02* (2013.01); *B60K 17/16* (2013.01);
(Continued)

(58) Field of Classification Search
CPC ........ B60K 17/02; B60K 1/00; B60K 7/0007; B60K 17/16
See application file for complete search history.

(56) References Cited

U.S. PATENT DOCUMENTS 4,433,744 A  *  2/1984  Mühlbacher ............. B60K 1/00
                                                       180/312
5,562,178 A  *  10/1996  Worden ................... B60K 1/00
                                                       180/291
(Continued)

FOREIGN PATENT DOCUMENTS

DE         102010024603 A1    12/2011
EP               1526027 A2  *  4/2005  ............. B60K 17/16
(Continued)

OTHER PUBLICATIONS

European Patent Office, International Search Report with Written Opinion, issued in PCT/US2017/049369, dated Jan. 16, 2018, 12 pages, European Patent Office, Rijswijk, Netherlands.

*Primary Examiner* — Jonathan Ng
*Assistant Examiner* — James J Triggs
(74) *Attorney, Agent, or Firm* — McCoy Russell LLP

(57) ABSTRACT

An electric drive axle having first and second axle shafts operatively connected by a differential apparatus, and an electric motor having a driving shaft coupled with a rotor of the electric motor is provided. A driving shaft may be coupled for rotation with a rotor of the electric motor, and disposed parallel with the first axle shaft. A first driving gear may be disposed on the driving shaft. A driven shaft having a first driven gear and a second driven gear, wherein the first (Continued)

driven gear meshes with the first driving gear. A layshaft disposed parallel with the first axle shaft may comprise a first layshaft gear coupled therewith and meshed with the second driven gear. A second layshaft gear disposed on the layshaft may be in meshed engagement with a first drive gear coupled with the differential apparatus case.

18 Claims, 10 Drawing Sheets

(51) Int. Cl.
     *B60K 1/00*     (2006.01)
     *B60K 17/02*     (2006.01)
     *B60K 17/16*     (2006.01)
     *B60K 17/04*     (2006.01)

(52) U.S. Cl.
     CPC ...... *B60K 17/046* (2013.01); *B60K 2001/001* (2013.01); *B60K 2007/0061* (2013.01)

(56) References Cited

U.S. PATENT DOCUMENTS

| | | | |
|---|---|---|---|
| 5,577,973 A | 11/1996 | Schmidt | |
| 6,158,326 A * | 12/2000 | Burgdorf | F16H 57/025 |
| | | | 92/72 |
| 6,360,836 B1 * | 3/2002 | Milano, Jr. | B62B 5/005 |
| | | | 180/65.6 |
| 6,864,607 B2 | 3/2005 | Hashimoto | |
| 7,028,583 B2 * | 4/2006 | Bennett | B60K 6/36 |
| | | | 74/661 |
| 7,244,210 B2 | 7/2007 | Hamai et al. | |
| 7,624,828 B2 * | 12/2009 | Kozarekar | B60K 6/445 |
| | | | 180/65.6 |
| 9,637,127 B1 | 5/2017 | Cooper | |
| 9,644,709 B2 * | 5/2017 | Venturi | B60K 6/387 |
| 9,683,650 B2 | 6/2017 | Kajikawa et al. | |
| 9,707,834 B2 | 7/2017 | Lee et al. | |
| 9,855,830 B2 | 1/2018 | Knoblauch | |
| 9,944,166 B2 | 4/2018 | Janson et al. | |
| 2016/0017958 A1 | 1/2016 | Wu et al. | |

FOREIGN PATENT DOCUMENTS

| | | |
|---|---|---|
| EP | 1526027 A2 | 4/2005 |
| FR | 2805221 A1 | 8/2001 |

\* cited by examiner

ELECTRIC DRIVE AXLE POWERPATH AND THE DRIVE AXLE MADE THEREWITH

BACKGROUND

The present disclosure relates to electric drive axles and more particularly to powerpaths for an electric axle.

Electric and hybrid-electric vehicles utilize an electric power source in communication with an electric motor to provide drive, or augmented drive, to the vehicle. Electric vehicles have several characteristics superior to conventional internal combustion engine driven vehicles. For example, electric motors produce fewer vibrations than internal combustion engines, and electric motors achieve maximum torque more quickly than internal combustion engines.

However, conventional electric vehicles utilize a drive axle driven by an electric motor without a gearbox. In order for the conventional electric vehicle to achieve sufficient speed, the electric motor must allow for reasonable power over a broad speed range. An electric motor which can provide reasonable power over a broad speed range is typically large and heavy.

In view of the above, there remains a need for an electric drive axle that does not require a broad speed range, such that the electric motor may be reduced in size and weight. The present disclosure provides, inter alia, an electric drive axle having reduced size, weight, and production costs.

SUMMARY

The present disclosure provides for an electric drive axle. In one embodiment, the electric drive axle includes first and second axle shafts operatively connected by a differential apparatus, and an electric motor concentrically disposed about the first axle shaft. A driving shaft may be coupled for rotation with a rotor of the electric motor and disposed concentrically with the first axle shaft. The electric drive axle may also include a first planetary gear set comprising a first sun gear coupled with the driving shaft, a first plurality of planet gears in meshed engagement with the first sun gear, a first carrier concentrically disposed about the first axle shaft, wherein the first plurality of planet gears are rotatably supported on the first carrier, and a first ring gear in meshed engagement with at least one of the planet gears. The electric drive axle may further include, a second planetary gear set disposed coaxial with the first axle shaft, comprising a second plurality of planet gears in meshed engagement with a second sun gear, a second carrier coaxially disposed with the first axle shaft, wherein the second plurality of planet gears are rotatably supported on the second carrier, and a second ring gear in meshed engagement with at least one of the planet gears.

In another embodiment, the electric drive axle includes first and second axle shafts operatively connected by a differential apparatus, and an electric motor concentrically disposed about the first axle shaft. A driving shaft may be coupled for rotation with a rotor of the electric motor and disposed concentrically with the first axle shaft. The electric drive axle may also include a layshaft having a first driven gear meshed with the driving gear, and disposed parallel with the first axle shaft. Additionally, the electric drive axle may include a planetary gear set comprising a sun gear coupled with the layshaft, a plurality of planet gears having at least one of the planet gears in meshed engagement with the sun gear, a carrier rotatably supporting the planet gears, and a planetary ring gear in meshed engagement with at least one of the planet gears. The electric drive axle may further include a second driven gear disposed on a driven shaft disposed coaxially with the layshaft, wherein the driven shaft is operatively driven by the plurality of planet gears. Further, a drive gear is coupled with the differential apparatus and meshed with the second driven gear.

In another embodiment, the electric drive axle includes first and second axle shafts operatively connected by a differential apparatus, and an electric motor concentrically disposed about the first axle shaft. A driving shaft may be coupled for rotation with a rotor of the electric motor, and disposed concentrically with the first axle shaft. The electric drive axle may also include a planetary gear set comprising a sun gear coupled with the driving shaft, a plurality of planet gears in meshed engagement with the sun gear, a carrier concentrically disposed about the first axle shaft, wherein the plurality of planet gears are rotatably supported on the carrier, and a ring gear in meshed engagement with at least one of the planet gears. A first driven gear may be disposed on the carrier and in meshed engagement with a second driven gear coupled with a layshaft disposed offset from the first axle shaft. Further, a third driven gear may be disposed on the layshaft and in meshed engagement with a first drive gear fixedly coupled with the differential apparatus case.

In yet another embodiment, the electric drive axle includes first and second axle shafts operatively connected by a differential apparatus, and an electric motor disposed offset from the first axle shaft. A driving shaft may be coupled for rotation with a rotor of the electric motor, and disposed parallel with the first axle shaft. A driving gear may be disposed on the driving shaft. The electric drive axle may also include a layshaft having a first layshaft gear and a second layshaft gear, wherein the first layshaft gear meshes with the driving gear. A driven shaft may be disposed parallel with the first axle shaft and comprise a first driven gear meshed with the second layshaft gear, and a sun gear. In addition, the electric drive axle may include a planetary gear set having a plurality of planet gears in meshed engagement with the sun gear. The planet gears may be meshed with a planetary ring gear, and the planet gears may be supported by a carrier that is coupled with the differential apparatus.

In another embodiment, the electric drive axle includes first and second axle shafts operatively connected by a differential apparatus, and an electric motor concentrically disposed about the first axle shaft. A driving shaft may be coupled for rotation with a rotor of the electric motor, and a driving gear may be disposed thereon. The electric drive axle may also include a driven shaft having first and second driven gears, wherein the first driven gear is meshed with the driving gear. In addition, a layshaft may be disposed parallel with the first axle shaft, having a first layshaft gear coupled with the layshaft and meshed with the second driven gear. A second layshaft gear disposed on the layshaft may be in meshed engagement with a drive gear coupled with the differential apparatus.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
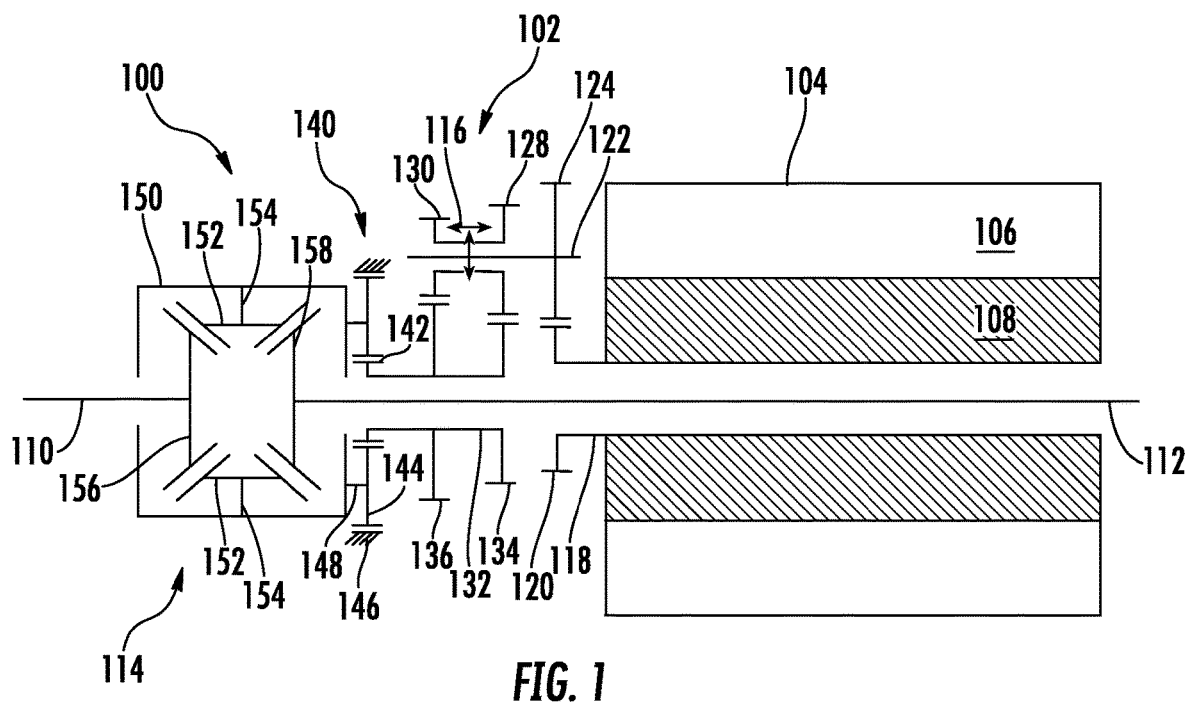
FIG. 1 schematically depicts of a two speed electric drive axle system according to an embodiment of the presently disclosed subject matter.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of an electric drive axle are described below. In certain embodiments, the electric drive axle is utilized with a pure electric vehicle (not depicted) where the electric drive axle is the only driving axle. In other embodiments, the electric drive axle is utilized with a hybrid four-wheel-drive vehicle (not depicted) where the front axle is driven by an internal combustion engine, and the rear axle is the electric drive axle (or vice versa). In still other embodiments, the electric drive axle is utilized in a hybrid commercial vehicle (not depicted) comprising a tandem axle in which the front tandem axle is driven by an internal combustion engine, and the rear tandem axle is the electric drive axle (or vice versa). The electric drive axle may have applications in commercial vehicles, both light duty and heavy duty vehicles, and for passenger, off-highway, and sport utility vehicles. Additionally, the electric drive axle described herein may be adapted for use in front and/or rear driving axles, and in steerable and non-steerable axles. It would be understood by one of ordinary skill in the art that the electric drive axle also has industrial, locomotive, military, agricultural, and aerospace applications.

The embodiments of an electric drive axle may be described herein utilizing the terms "driven shaft" and "driving shaft." A person having skill in the art will recognize that in a regeneration mode, the driven shafts are driving, and the driving shafts are driven.

The electric drive axle powerpaths disclosed herein can be divided into two distinct classes, one-speed and two-speed. In a one-speed embodiment, an electric drive axle couples an electric motor with a differential case without any shifting capability. In a two-speed embodiment, an electric drive axle comprises a shifting capability, which may be indicated as a two-speed gearbox. The one-speed and two-speed electric drive axles of the presently disclosed subject matter may also comprise a mechanical differential lock (not depicted) and a parking brake/pawl.

As illustrated in FIG. 1, in an embodiment, an electric drive axle 100 may comprise an integrated drive system. In an embodiment, the electric drive axle 100 includes a two-speed gearbox 102 and an electric motor 104 (e.g., electromotor). The electric drive axle 100 also comprises a drive axle having a pair of side shafts 110, 112, a pair of wheels (not depicted), and a differential apparatus 114. Additionally, the electric drive axle 100 comprises an inverter (not depicted) for converting direct current to alternating current when the electric motor 104 is utilized to drive the vehicle, and for converting alternating current to direct current when the vehicle decelerates. The electric drive axle 100 also comprises a shifting mechanism 116.

In addition, the electric drive axle 100 includes cooling fluid (not depicted) such as, but not limited to, automatic transmission fluid or axle oil integrated with the electric drive axle 100 lubricant for cooling the electric motor 104 and the inverter. In another embodiment (not depicted), the cooling fluid for the electric motor 104 and the inverter may not be integrated with the axle oil.

The two-speed gearbox 102 enables the electric drive axle 100 to utilize the electric motor 104 having a compact speed range, as compared to conventional electric motors. Because the electric motor 104 has a compact speed range, it may be smaller than a conventional electric motor, and it may use less expensive material and fewer rare materials than a conventional electric motor. In an embodiment, the electric motor 104 is a permanent magnet synchronous machine comprising a stator 106 disposed concentrically about a rotor 108.

A driving shaft 118 is coupled with the rotor 108 for rotation therewith. In an embodiment, the driving shaft 118 comprises an end having gear teeth 120. In another embodiment, the gear teeth 120 may comprise a gear coupled for rotation with the driving shaft 118. The driving shaft 118 is in driving engagement with a layshaft 122 of the two-speed gearbox 102 via the gear teeth 120. The gear teeth 120 are in meshed engagement with a gear 124 disposed on the layshaft 122.

A first gear 128 and a second gear 130 are disposed concentrically about a portion of the layshaft 122. The first and second gears 128, 130 are selectively, and independently, drivingly engaged with the layshaft 122 via the shifting mechanism 116. A driven shaft 132 is disposed about the axle half shaft 112 coaxial with the driving shaft 118. A first driven gear 134 is coupled with the driven shaft 132 for rotation therewith. The first driven gear 134 is in constant meshed engagement with the first gear 128 to create a first gear ratio. A second driven gear 136 is also coupled with the driven shaft 132 for rotation therewith. The second driven gear 136 is in constant meshed engagement with the second gear 130 to create a second gear ratio.

In an embodiment, the shift element 116 may be a synchronizer. In another embodiment, the shift element 116 may be a dog clutch. In yet another embodiment, the shift element 116 may be a pair of wet clutches. When the shift element 116 is actuated such that the shift element 116 drivingly engages the layshaft 122 with the first gear 128, the gear box 102 is placed in a first speed reduction mode. When the shift element 116 is actuated such that the shift element 116 drivingly engages the layshaft 122 with the second gear 130, the gear box 102 is placed in a second speed reduction mode.

Simultaneously engaging both the first and second gears 128, 130 with the layshaft 122 via the shift element 116 locks the gearbox 102, and there is no rotation through the electric drive axle 100. Simultaneously engaging the first and second gears 128, 130 with the layshaft 122 may be utilized as a parking brake, or as a supplement to a conventional parking brake.

The two-speed gearbox 102 further comprises a planetary gear system 140 disposed between the differential apparatus 114 and the electric motor 104. The planetary gear system 140 comprises a sun gear 142 coupled for rotation with the driven shaft 132. A plurality of planet gears 144 are in meshed engagement with the sun gear 142, and are driven thereby. The planet gears 144 are also in meshed engagement with a source for ground, such as a stationary housing 146. In an embodiment, the stationary housing 146 comprises a locked planetary ring gear. In addition, the planet gears 144 are carried by a planet carrier 148 coupled for rotation with a differential case 150.

The differential apparatus 114 comprises two or more differential pinions 152. The differential pinions 152 are coupled with the differential case 150 via a pinion shaft 154 (i.e., spider shaft). In an embodiment, the pinion shaft 154 may comprise a cross member. The differential pinions 152 are in meshed engagement with a pair of side gears 156, 158 coupled for rotation with the drive axle half shafts 110, 112, respectively.

Figure 2:
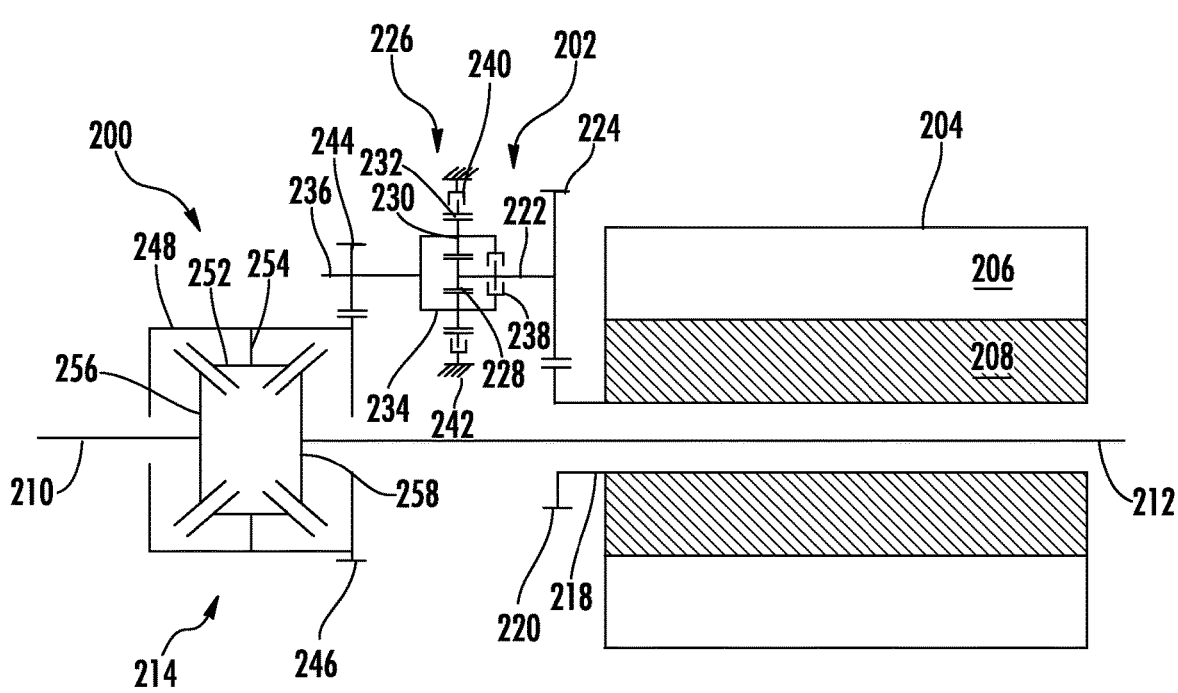
FIG. 2 schematically depicts a two speed electric drive axle system according to another embodiment of the presently disclosed subject matter.

As illustrated in FIG. 2, in another embodiment, an electric drive axle 200 may comprise an integrated drive system. The electric drive axle 200 includes a two-speed gearbox 202 and an electric motor 204. The electric motor 204 comprises a stator 206 and a rotor 208. The electric drive axle 200 also comprises a drive axle having a pair of side shafts 210, 212, a pair of wheels (not depicted), and a differential apparatus 214. Additionally, the electric drive axle 200 may comprise an inverter (not depicted) for converting direct current to alternating current when the electric motor 204 is utilized to drive the vehicle, and for converting alternating current to direct current when the vehicle decelerates.

A driving shaft 218 is coupled with the rotor 208 for rotation therewith. In an embodiment, a driving gear 220 is coupled with the driving shaft 218. In another embodiment, the driving shaft 218 comprises an end having driving gear 220. The driving shaft 218 is in driving engagement with a layshaft 222 of the two-speed gearbox 202 via the driving gear 220. The driving gear 220 may be in meshed engagement with a spur gear 224 disposed on the layshaft 222.

A planetary gear system 226 is disposed on, and driven by, the layshaft 222. The planetary gear system 226 comprises a sun gear 228 in driving engagement with the layshaft 222. A plurality of planet gears 230 are in meshed engagement with the sun gear 228, and are driven thereby. The planet gears 230 are also in meshed engagement with a planetary ring gear 232. In addition, the planet gears 230 are carried by a planet carrier 234 coupled for rotation with a driven shaft 236. The planet carrier 234 extends on either side of the plurality of planet gears 230.

A first engagement element 238 is disposed on the layshaft 222 for selectively engaging the layshaft 222 and the planet carrier 234. In an embodiment, the first engagement element 238 may comprise a synchronizer apparatus. In another embodiment, the first engagement element 238 may comprise a dog clutch. In yet other embodiments, the first engagement element 238 may comprise any shift element suitable for selectively engaging the layshaft 222 and the planet carrier 234. The first engagement element 238 locks the planetary gear system 226 such that the planetary gear system 226 rotates without a reduction. In another embodiment, locking the planetary gear system 226 may be realized by engaging two elements of the planetary gear system 226, such as the sun gear 228, ring gear 232, or planet carrier 234.

A second engagement element 240 is coupled with a stationary housing portion 242 of the gearbox 202. The second engagement element 240 selectively engages the planetary ring gear 232 to provide a source for ground for the planetary gear system 226. The second engagement element 240 may comprises any shift element suitable for selectively engaging the stationary housing 242 and the planetary ring gear 232. In an embodiment, the second engagement element 240 may comprise a multi-plate clutch. In another embodiment, the second engagement element 240 may comprise a dog clutch.

In a first speed reduction mode, the first engagement element 238 is operative to couple the layshaft 222 and the planet carrier 234, and the second engagement element 240 is inoperative such that the planetary ring gear 232 rotates with the plurality of planet gears 230. In the first speed reduction mode, the planet carrier 234 drives the driven shaft 236 without a reduction through the planetary gear system 226.

In a second speed reduction mode, the first engagement element 238 is inoperative such that the layshaft 222 drives the sun gear 228, and the second engagement element 240 is operative to lock the planetary ring gear 232 to the stationary housing 242. In the second speed reduction mode, the sun gear 228 drives the plurality of planet gears 230 within the planetary ring gear 232 and the planet carrier 234 drives the driven shaft 236 producing a reduction through the planetary gear system 226.

If both the first and second engagement elements 238, 240 are simultaneously engaged, the gearbox 202 becomes locked and there is not rotation through the electric drive axle 200. Simultaneously engaging the first and second engagement elements 238, 240 may be utilized as a parking brake, or as a supplement to a conventional parking brake.

A gear 244 is disposed on the driven shaft 236 for rotation therewith. The gear 244 is in meshed engagement with a gear 246 coupled with a differential case 248. Two or more differential pinions 252 are coupled with the differential case 248 via a pinion shaft 254 (i.e., spider shaft). In an embodiment, the pinion shaft 254 may comprise a cross member. The differential pinions 252 are in meshed engagement with a pair of side gears 256, 258 coupled for rotation with the drive axle half shafts 210, 212, respectively.

Figure 3:
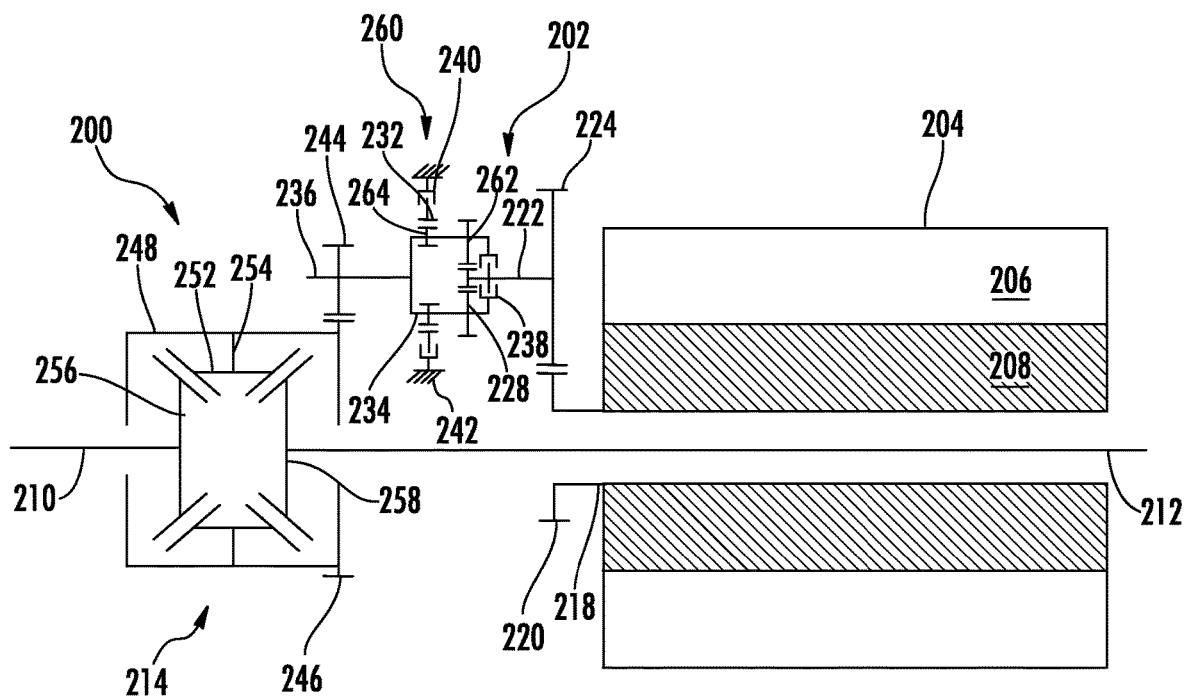
FIG. 3 schematically depicts the two speed electric drive axle system according to FIG. 2 having a stepped pinion planetary gear set.

In another embodiment, as illustrated in FIG. 3, the electric drive axle 200 may comprise a stepped pinion planetary gear set 260. Utilizing a stepped pinion planetary gear set 260 enables a greater, or smaller, planetary ring gear 232 to sun gear 228 ratio. The stepped pinion planetary gear set 260 includes the sun gear 228 in driving engagement with a first set of planet gears 262. The first set of planet gears 262 is rotatably disposed on the planet carrier 234. A second set of planet gears 264 is rotatably disposed on the planet carrier 234 inboard of the first set of planet gears 262. The second set of planet gears 264 each have a smaller diameter than the first set of planet gears 262. In an embodiment, the second set of planet gears 264 each have a larger diameter than the first set of planet gears 262. The second set of planet gears 264 is in meshed engagement with the planetary ring gear 232. The other elements of the electric drive axle 200 operate as described above in relation to FIG. 2.

Figure 4:
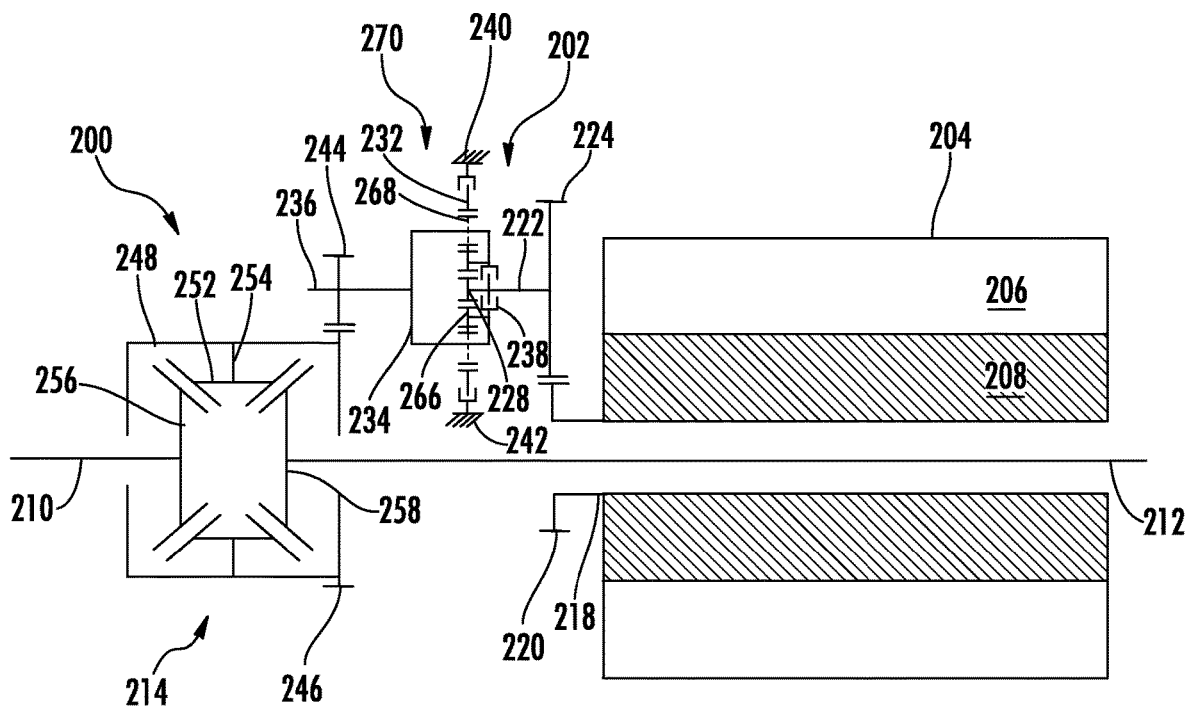
FIG. 4 schematically depicts a two speed electric drive axle system according to FIG. 2 having a double pinion planetary gear set.
Figure 4A:
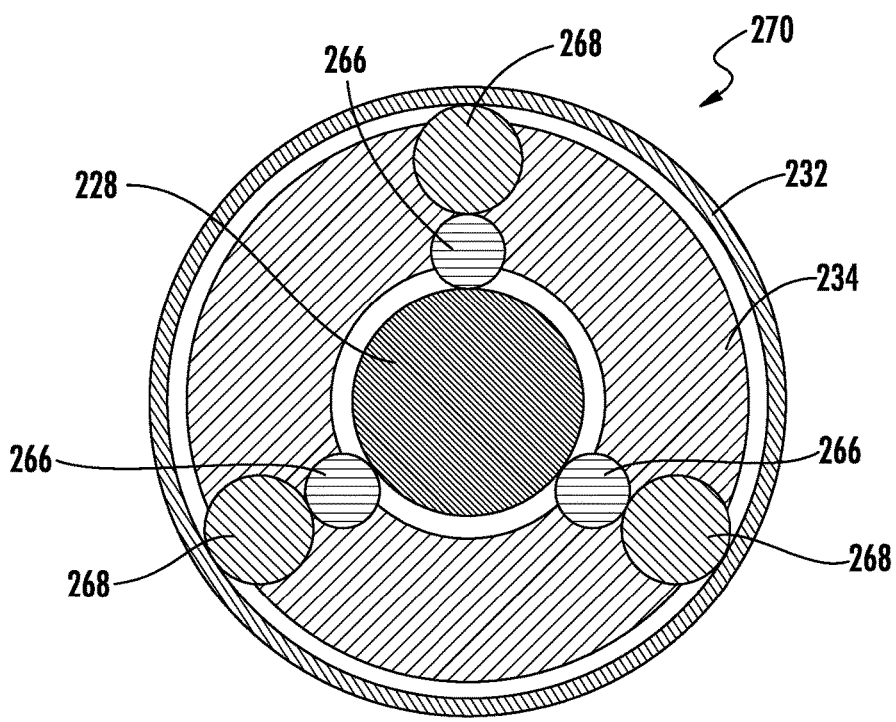
FIG. 4A schematically depicts a portion of the double pinion planetary gear set of FIG. 4, according to an embodiment of the presently disclosed subject matter.

As illustrated in FIGS. 4 and 4A, in an embodiment, the electric drive axle 200 may comprise a double pinion planetary gear set 270. The double pinion planetary gear set 270 includes the sun gear 228 in driving engagement with a first set of planet gears 266. The first set of planet gears 266 is rotatably disposed on the planet carrier 234 via corresponding pins thereon. A second set of planet gears 268 is rotatably disposed on the planet carrier 234 radially outward of the first set of planet gears 266. The second set of planet gears 268 each have a greater diameter than the first set of planet gears 264. In an embodiment, the second set of planet gears 268 each have a smaller diameter than the first set of planet gears 264. The second set of planet gears 268 is in meshed engagement with the planetary ring gear 232 and the first set of planet gears 266. In FIG. 4A, the first and second sets of planet gears 266, 268 are each illustrated as comprising three gears; however, the double pinion planetary gear set 270 is not limited thereto, and may comprise a greater or fewer number of planet gears.

The rotational direction of the gear 244 disposed on the driven shaft 236 is reversed when the second engagement element 240 is engaged and the first engagement element 238 is disengaged. To maintain the direction of rotation of the output, the rotational direction of the electric motor 204 is reversed when the second engagement element 240 is engaged. The other elements of the electric drive axle 200 operate as described above in relation to FIG. 2.

Figure 5:
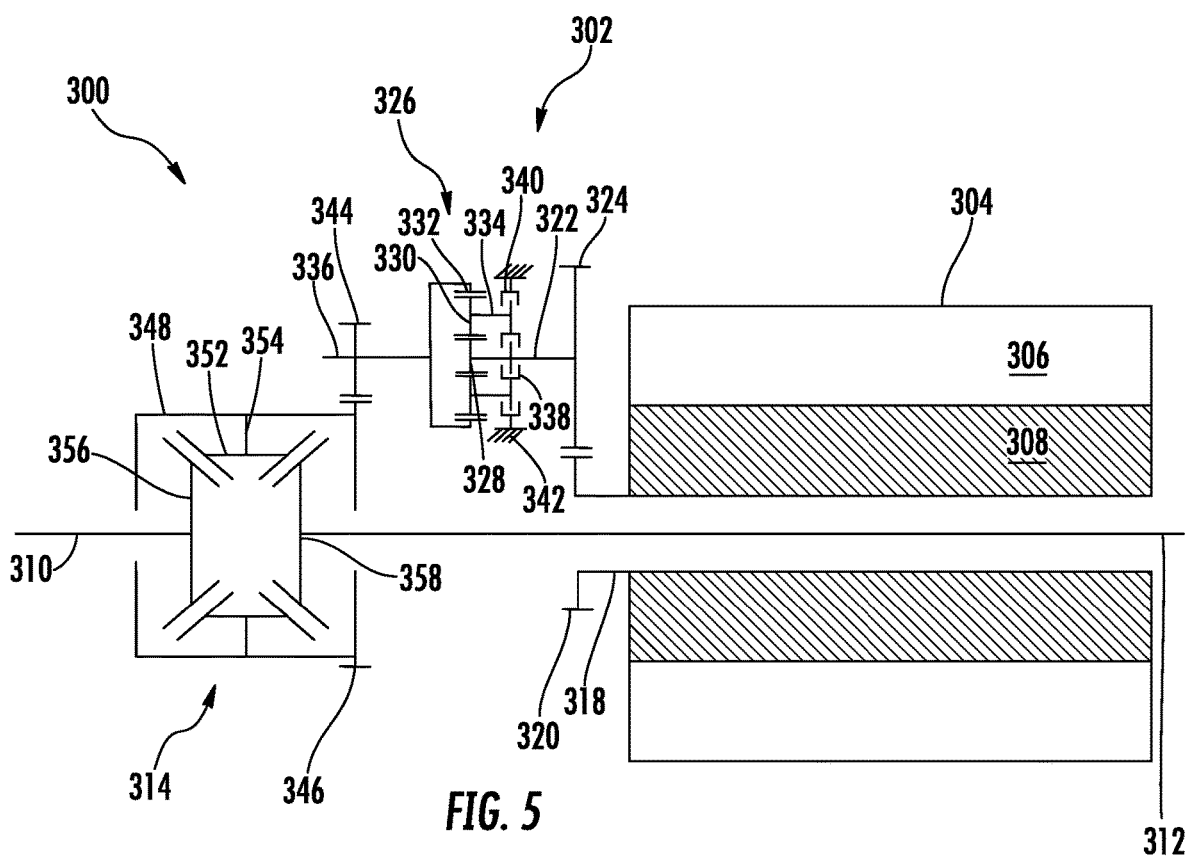
FIG. 5 schematically depicts a two speed electric drive axle system according to another embodiment of the presently disclosed subject matter.

As illustrated in FIG. 5, in another embodiment, an electric drive axle 300 may comprise an integrated drive system having a similar geometry to the electric drive axle 200. The electric drive axle 300 includes a two-speed gearbox 302 and an electric motor 304. The electric motor 304 comprises a stator 306 and a rotor 308. The electric drive axle 300 also comprises a drive axle having a pair of side shafts 310, 312, a pair of wheels (not depicted), and a differential apparatus 314. Additionally, the electric drive axle 300 may comprise an inverter (not depicted) for converting direct current to alternating current when the electric motor 304 is utilized to drive the vehicle, and for converting alternating current to direct current when the vehicle decelerates.

A driving shaft 318 is coupled with the rotor 308 for rotation therewith. The driving shaft 318 is coupled for rotation with a gear 320 disposed at an inboard end thereof. The driving shaft 318 is in driving engagement with a layshaft 322 of the two-speed gearbox 302 via the gear 320. The gear 320 is in meshed engagement with a driven gear 324 disposed on the layshaft 322.

A planetary gear system 326 is disposed on, and driven by, the layshaft 322. The planetary gear system 326 comprises a sun gear 328 in driving engagement with the layshaft 322. A plurality of planet gears 330 are in meshed engagement with the sun gear 328, and are driven thereby. The planet gears 330 are also in meshed engagement with a planetary ring gear 332. In addition, the planet gears 330 are carried by a planet carrier 334. The planet carrier 334 is selectively engageable with the layshaft 322 for rotation therewith via a first engagement element 338.

The first engagement element 338 is disposed on the layshaft 322 for selectively engaging the layshaft 322 and the planet carrier 334. The first engagement element 338 may comprise a synchronizer, a dog clutch, a multi-plate clutch, or any shift element suitable for selectively engaging the layshaft 322 and the planet carrier 334.

A second engagement element 340 is coupled with a stationary housing portion 342 of the gearbox 302. The second engagement element 340 selectively engages the planet carrier 334 with the stationary housing 342. The second engagement element 340 may comprise any shift element suitable for selectively engaging the stationary housing 342 and the planet carrier 334. In an embodiment, the second engagement element 340 may comprise a multi-plate clutch. In other embodiments, the second engagement element 340 may comprise a dog clutch, or a synchronizer.

In a first speed reduction mode, the first engagement element 338 is operative to couple the layshaft 322 and the planet carrier 334, and the second engagement element 340 is inoperative such that the planet carrier 334 rotates with the plurality of planet gears 330. In the first speed reduction mode, the planet carrier 334 drives the planetary ring gear 332, and the planetary ring gear 332 drives a driven shaft 336 coupled therewith without a reduction through the planetary gear system 326.

In a second speed reduction mode, the first engagement element 338 is inoperative such that the layshaft 322 drives the sun gear 328, and the second engagement element 340 is operative to lock the planet carrier 334 to the stationary housing 342. In the second speed reduction mode, the sun gear 328 drives the plurality of planet gears 330 which drive the planetary ring gear 332, and the planetary ring gear 332 drives the driven shaft 336 producing a reduction through the planetary gear system 326.

A gear 344 is disposed on the driven shaft 336 for rotation therewith. The gear 344 is in meshed engagement with a gear 346 coupled with a differential case 348. Two or more differential pinions 352 are coupled with the differential case 348 via a pinion shaft 354 (i.e., spider shaft). In an embodiment, the pinion shaft 354 may comprise a cross member. The differential pinions 352 are in meshed engagement with a pair of side gears 356, 358 coupled for rotation with the drive axle half shafts 310, 312, respectively.

The rotational direction of the gear 344 disposed on the driven shaft 336 is reversed when the second engagement element 340 is engaged and the first engagement element 338 is disengaged. To maintain the direction of rotation of the output, the rotational direction of the electric motor 304 is reversed when the second engagement element 340 is engaged. If both the first and second engagement elements 338, 340 are simultaneously engaged, the gearbox 302 becomes locked and there is not rotation through the electric drive axle 300. Simultaneously engaging the first and second engagement elements 338, 340 may be utilized as a parking brake, or as a supplement to a conventional parking brake.

In an embodiment (not depicted), the planetary gear system 326 may comprise a double pinion planetary gear system. Where the planetary gear system 326 comprises a double pinion planetary gear system, the second speed reduction mode will cause the gear 344 on the driven shaft 336 to rotate in the opposite direction. In this embodiment, to maintain the direction of driving rotation to the differential mechanism 314 in both the first and second speed reduction modes, the direction of rotation of the electric motor 304 is switched when the second speed reduction mode is engaged.

Figure 6:
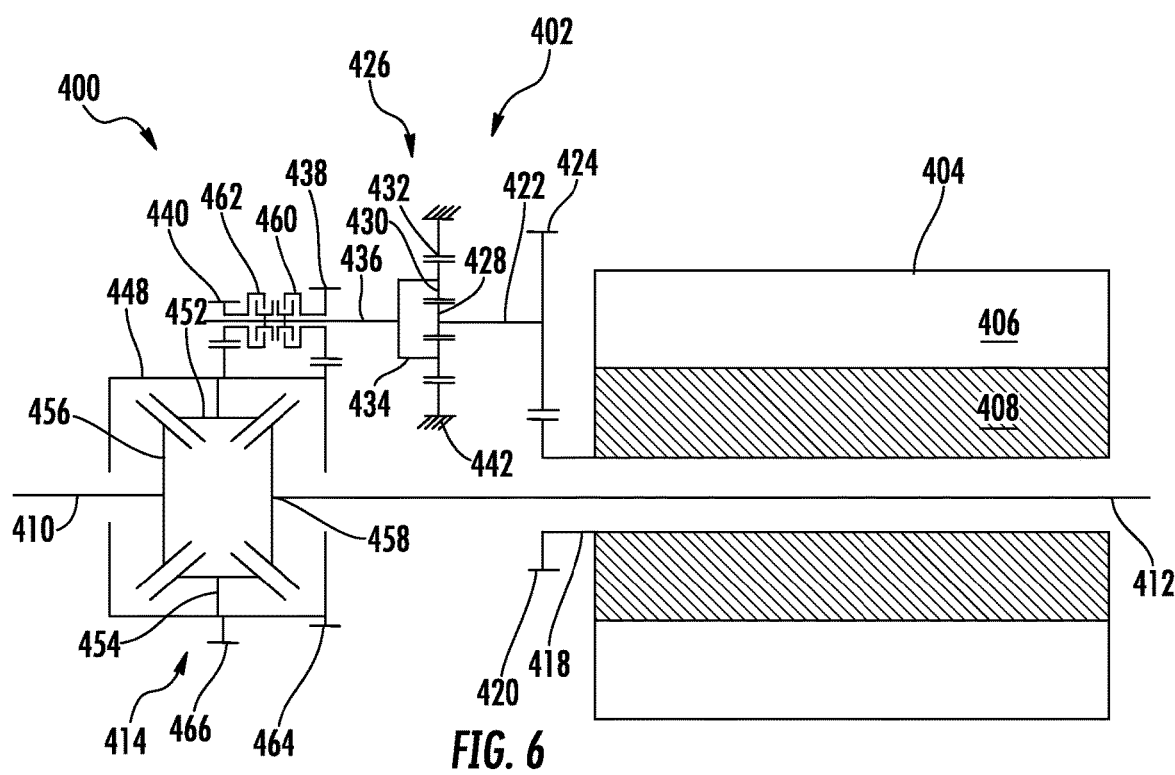
FIG. 6 schematically depicts a two speed electric drive axle system according to another embodiment of the presently disclosed subject matter.

As illustrated in FIG. 6, in another embodiment, an electric drive axle 400 may comprise an integrated drive system having a similar geometry to the electric drive axle 100. The electric drive axle 400 includes a two-speed gearbox 402 and an electric motor 404. The electric motor 404 comprises a stator 406 and a rotor 408. The electric drive axle 400 also comprises a drive axle having a pair of side shafts 410, 412, a pair of wheels (not depicted), and a differential apparatus 414. Additionally, the electric drive axle 400 may comprise an inverter (not depicted) for converting direct current to alternating current when the electric motor 404 is utilized to drive the vehicle, and for converting alternating current to direct current when the vehicle decelerates.

A driving shaft 418 is coupled with the rotor 408 for rotation therewith. In an embodiment, the driving shaft 418 is coupled for rotation with a gear 420 disposed at an inboard end thereof. The driving shaft 418 is in driving engagement with a layshaft 422 of the two-speed gearbox 402 via the gear 420. The gear 420 is in meshed engagement with a driven gear 424 disposed on the layshaft 422.

A planetary gear system 426 is disposed on, and driven by, the layshaft 422. The planetary gear system 426 comprises a sun gear 428 in driving engagement with the layshaft 422. A plurality of planet gears 430 are in meshed engagement with the sun gear 428, and are driven thereby. The planet gears 430 are also in meshed engagement with a planetary ring gear 432. The planetary ring gear 432 is fixedly coupled with a stationary housing portion 442. In addition, the planet gears 430 are carried by a planet carrier 434.

The planet carrier 434 is coupled for rotation with a driven shaft 436. A first gear 438 and a second gear 440 are disposed on the driven shaft 436. The first and second gears 438, 440 are independently selectively engageable with the driven shaft 436 for rotation therewith. A first engagement element 460 is coupled with the driven shaft 436. The first engagement element 460 selectively couples the first gear 438 with the driven shaft 436 to be driven thereby. A second engagement element 462 is coupled with the driven shaft 436 adjacent to the first engagement element. The second engagement element 462 selectively couples the second gear 440 with the driven shaft 436 to be driven thereby.

In an embodiment, the first and second selective engagement elements 460, 462 may comprise a synchronizer apparatus. In another embodiment, the first and second selective engagement elements 460, 462 may comprise dog clutches. In yet another embodiment, the first and second selective engagement elements 460, 462 may comprise a pair of multi-plate clutches. In still another embodiment, the first and second selective engagement elements 460, 462 may comprise a wet clutch powershift design. The first and second selective engagement elements 460, 462 may be operated by one or more actuators (e.g., an electromechanical, hydraulic, or pneumatic actuator). If both the first and second engagement elements 460, 462 are simultaneously engaged, the gearbox 402 becomes locked and there is not rotation through the electric drive axle 400. Simultaneously engaging the first and second engagement elements 460, 462 may be utilized as a parking brake, or as a supplement to a conventional parking brake.

The first gear 438 is in driving engagement with a first differential gear 464. The first differential gear 464 is fixedly coupled with a differential case 448. The second gear 440 is in driving engagement with a second differential gear 466. The second differential gear 466 is also fixedly coupled with the differential case 448. Two or more differential pinions 452 are coupled within the differential case 448 via a pinion shaft 454 (i.e., spider shaft). In an embodiment, the pinion shaft 454 may comprise a cross member. The differential pinions 452 are in meshed engagement with a pair of side gears 456, 458 coupled for rotation with the drive axle half shafts 410, 412, respectively.

Figure 7:
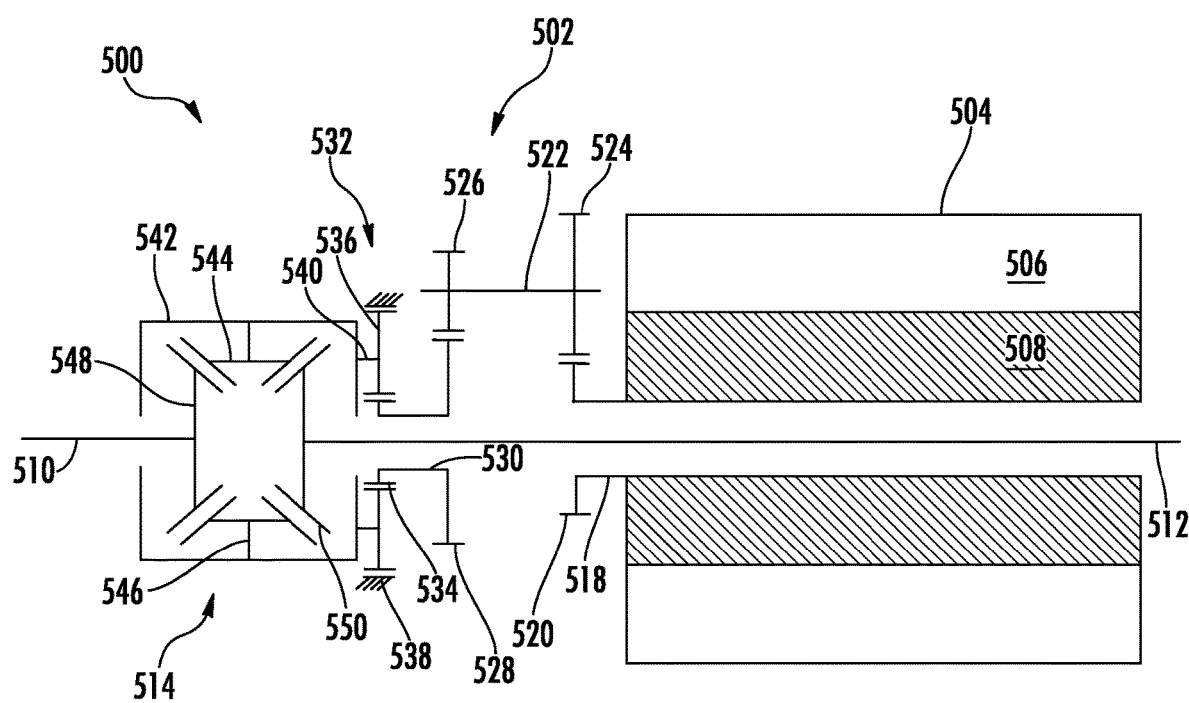
FIG. 7 schematically depicts a one speed electric drive axle system according to another embodiment of the presently disclosed subject matter.

As illustrated in FIG. 7, in another embodiment, a one-speed electric drive axle 500 may comprise an integrated drive system having a similar geometry to the electric drive axle 100. The electric drive axle 500 includes a one-speed gearbox 502 and an electric motor 504. The electric motor 504 comprises a stator 506 and a rotor 508. The electric drive axle 500 also comprises a drive axle having a pair of side shafts 510, 512, a pair of wheels (not depicted), and a differential apparatus 514. Additionally, the electric drive axle 500 may comprise an inverter (not depicted) for converting direct current to alternating current when the electric motor 504 is utilized to drive the vehicle, and for converting alternating current to direct current when the vehicle decelerates.

A driving shaft 518 is coupled with the rotor 508 for rotation therewith. In an embodiment, the driving shaft 518 is coupled for rotation with a gear 520 disposed at an inboard end thereof. The driving shaft 518 is in driving engagement with a layshaft 522 of the one-speed gearbox 502 via the gear 520. The gear 520 is in meshed engagement with a layshaft input gear 524 disposed on the layshaft 522.

A layshaft output gear 526 is also disposed on the layshaft 522 at an inboard end thereof. The layshaft output gear 526 is coupled for rotation with the layshaft 522 and in meshed engagement with an input gear 528 of a driven shaft 530. The driven shaft 530 is disposed concentrically about the axle half shaft 512.

The gearbox 502 also comprises a planetary gear system 532. The planetary gear system 532 comprises a sun gear 534 disposed on the driven shaft 530 for rotation therewith.

A plurality of planet gears 536 are in meshed engagement with the sun gear 534, and are driven thereby. The planet gears 536 are also in meshed engagement with a planetary ring gear 538. The planetary ring gear 538 comprises a stationary housing portion. In another embodiment, the planetary ring gear 538 may be and independent component fixedly coupled with the stationary housing.

In addition, the planet gears 536 are carried by a planet carrier 540. The planet carrier 540 is fixedly coupled with a differential case 542. The differential case 542 is rotatably driven via the planet carrier 540. Two or more differential pinions 544 are coupled within the differential case 542 via a pinion shaft 546 (i.e., spider shaft). In an embodiment, the pinion shaft 546 may comprise a cross member. The differential pinions 544 are in meshed engagement with a pair of side gears 548, 550. The side gears 548, 500 are coupled for rotation with the drive axle half shafts 510, 512, respectively.

Figure 8:
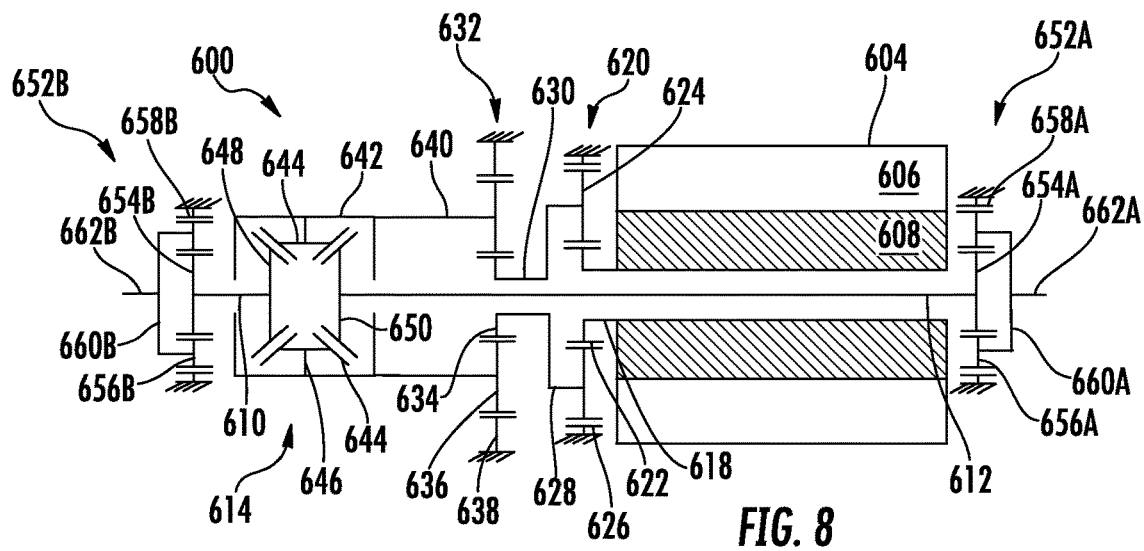
FIG. 8 schematically depicts a one-speed electric drive axle system according to another embodiment of the presently disclosed subject matter.

As illustrated in FIG. 8, an embodiment of a one-speed electric drive axle 600 may comprise an integrated drive system. The electric drive axle 600 includes an electric motor 604 that is radially concentric with one of a pair of axle half shafts 610, 612 extending from a differential 614. The electric motor 604 comprises a stator 606 and a rotor 608. Additionally, the electric drive axle 600 may comprise an inverter (not depicted) for converting direct current to alternating current when the electric motor 604 is utilized to drive the vehicle, and for converting alternating current to direct current when the vehicle decelerates.

A driving shaft 618 is coupled with the rotor 608 for rotation therewith. The driving shaft 618 is disposed concentrically about the axle half shaft 612. The electric drive axle 600 also includes three planetary gear systems. A first planetary gear system 620 is provided inboard of the electric motor 604, and is disposed concentric with the axle half shaft 612. The driving shaft 618 is coupled for rotation with a first sun gear 622 disposed at an inboard end thereof. The first sun gear 622 provides an input to the first planetary gear system 620. A plurality of planet gears 624 are in meshed engagement with the sun gear 622, and are driven thereby. The planet gears 624 are also in meshed engagement with a planetary ring gear 626. The planetary ring gear 626 may comprise a portion of a stationary housing. In another embodiment, the planetary ring gear 626 may be an independent component fixedly coupled with the stationary housing. As illustrated in FIG. 8, the planetary ring gear 626 is a fixed (i.e., non-rotating) component. Additionally, the planet gears 624 are carried by a planet carrier 628. The planet carrier 628 comprises a driven shaft 630 disposed concentrically about the axle half shaft 612.

A second planetary gear system 632 is provided between the differential 614 and the first planetary gear system 620, and disposed concentrically about the axle half shaft 612. The first and second planetary gear systems 620, 632 function to provide a large speed reduction between the differential 614 and the electric motor 604. Coupled with an end of the driven shaft 630 is a second sun gear 634. The second sun gear 634 inputs a driving force to the second planetary gear system 632. A plurality of planet gears 636 are in meshed engagement with the sun gear 634, and are driven thereby. The planet gear The second planetary ring gear 638 is a non-rotating gear element which may comprise a portion of a stationary housing or an independent component fixedly coupled with the stationary housing. Additionally, the planet gears 636 are carried by a planet carrier 640. The planet carrier 640 is coupled for rotation with a differential case 642.

The differential case 642 is rotatably driven via the planet carrier 640. Two or more differential pinions 644 are coupled within the differential case 642 via a pinion shaft 646 (i.e., spider shaft). In an embodiment, the pinion shaft 646 may comprise a cross member. The differential pinions 644 are in meshed engagement with a pair of side gears 648, 650. The side gears 648, 650 are coupled for rotation with the drive axle half shafts 610, 612, respectively.

A third planetary gear system 652A, 652B is provided at or adjacent to each wheel end of the electric drive axle 600. The third planetary gear system 652A, 652B functions as a reduction gear system. In an embodiment, the third planetary gear system 652A, 652B may be embedded inside each wheel hub, respectively. All of the components between the third planetary gear system 652A, 652B and the electric motor 604 rotate faster, but transfer less torque, such that the components between the third planetary gear system 652A, 652B and the electric motor 604 may be reduced in size.

Referring now to FIG. 8, a third sun gear 654A is coupled with an outboard end of the axle half shaft 612 to provide driving input to the third planetary gear system 652A disposed at the outboard end of the axle half shaft 612. A plurality of planet gears 656A are in meshed engagement with the fourth sun gear 654A, and are driven thereby. The planet gears 656A are also in meshed engagement with a third planetary ring gear 658A. The third planetary ring gear 638A is a non-rotating gear element which may comprise a portion of the stationary housing or an independent component fixedly coupled with the stationary housing. Additionally, the planet gears 656A are carried by a planet carrier 660A. The planet carrier 660A is coupled for rotation with a stub shaft 662A.

A fourth sun gear 654B is coupled with an outboard end of the axle half shaft 610 to provide driving input to the third planetary gear system 652B disposed at the outboard end of the axle half shaft 610. A plurality of planet gears 656B are in meshed engagement with the fourth sun gear 654B, and are driven thereby. The planet gears 656B are also in meshed engagement with a fourth planetary ring gear 658B. The fourth planetary ring gear 638B is a non-rotating gear element which may comprise a portion of the stationary housing or an independent component fixedly coupled with the stationary housing. Additionally, the planet gears 656B are carried by a planet carrier 660B. The planet carrier 660B is coupled for rotation with a stub shaft 662B.

Figure 9:
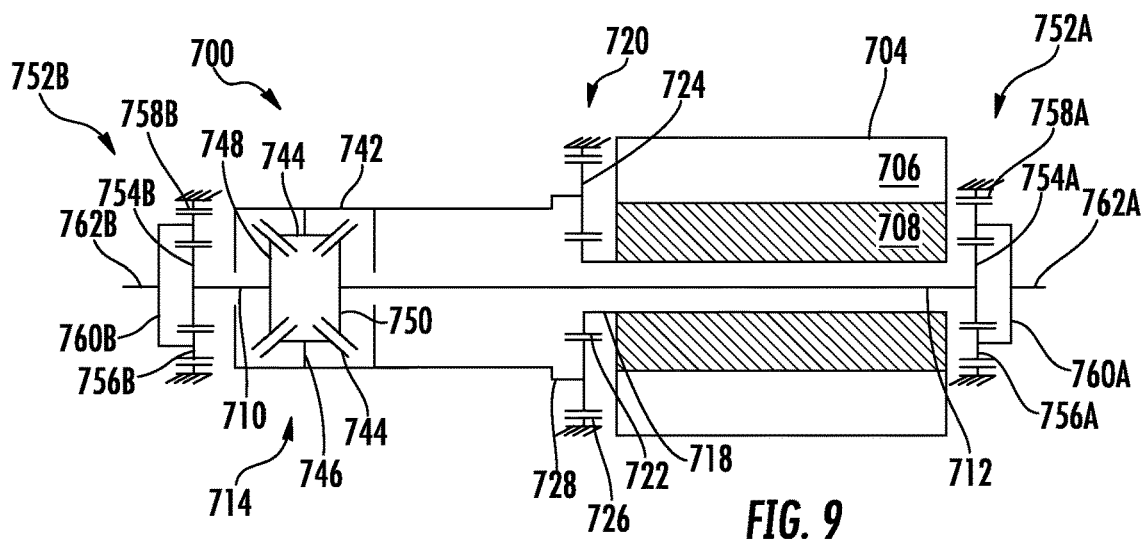
FIG. 9 schematically depicts a one-speed electric drive axle system according to another embodiment of the presently disclosed subject matter.

As illustrated in FIG. 9, an embodiment of a one-speed electric drive axle 700 may comprise an integrated drive system. The electric drive axle 700 includes an electric motor 704 that is radially concentric with one of a pair of axle half shafts 710, 712 extending from a differential 714. The electric motor 704 comprises a stator 706 and a rotor 708. Additionally, the electric drive axle 700 may comprise an inverter (not depicted) for converting direct current to alternating current when the electric motor 704 is utilized to drive the vehicle, and for converting alternating current to direct current when the vehicle decelerates.

The electric drive axle 700 is a variation of the one-speed electric drive axle 600. The difference is that in the electric drive axle 700 the planetary gear system disposed between a first planetary gear system 720 and the differential case 742 is eliminated, so that the differential case 742 is coupled with the first planetary gear system 720. The electric drive axle 700 comprises the first planetary gear system 720 and a second planetary gear system 752A, 752B disposed at each wheel end. Compared to the electric drive axle 600 depicted in FIG. 8, the overall speed reduction in the electric drive axle 700 is smaller than the speed reduction in the electric drive axle 600.

Similar to the electric drive axle 600, in the electric drive axle 700 a driving shaft 718 is coupled with the rotor 708 for rotation therewith. The driving shaft 718 is disposed concentrically about the axle half shaft 712. The electric drive axle 700 also includes three planetary gear systems. A first planetary gear system 720 is provided inboard of the electric motor 704, and is disposed concentric with the axle half shaft 712. The driving shaft 718 is coupled for rotation with a first sun gear 722 disposed at an inboard end thereof. The first sun gear 722 provides an input to the first planetary gear system 720. A plurality of planet gears 724 are in meshed engagement with the sun gear 722, and are driven thereby. The planet gears 724 are also in meshed engagement with a planetary ring gear 726. The planetary ring gear 726 may comprise a portion of a stationary housing. In another embodiment, the planetary ring gear 726 may be an independent component fixedly coupled with the stationary housing. Additionally, the planet gears 724 are carried by a planet carrier 728. The planet carrier 728 is coupled with the differential case 742.

The differential case 742 is rotatably driven via the planet carrier 740. Two or more differential pinions 744 are coupled within the differential case 742 via a pinion shaft 746 (i.e., spider shaft). In an embodiment, the pinion shaft 746 may comprise a cross member. The differential pinions 744 are in meshed engagement with a pair of side gears 748, 750. The side gears 748, 750 are coupled for rotation with the drive axle half shafts 710, 712, respectively.

The second planetary gear system 752A, 752B is provided at or adjacent to each wheel end of the electric drive axle 700. The second planetary gear system 752A, 752B functions as a reduction gear system. A second sun gear 754A is coupled with an outboard end of the axle half shaft 712 to provide driving input to the second planetary gear system 752A disposed at the outboard end of the axle half shaft 712. A plurality of planet gears 756A are in meshed engagement with the second sun gear 754A, and are driven thereby. The planet gears 756A are also in meshed engagement with a second planetary ring gear 758A. The second planetary ring gear 738A is a non-rotating gear element which may comprise a portion of the stationary housing or an independent component fixedly coupled with the stationary housing. Additionally, the planet gears 756A are carried by a planet carrier 760A. The planet carrier 760A is coupled for rotation with a stub shaft 762A.

A third sun gear 754B is coupled with an outboard end of the axle half shaft 710 to provide driving input to the third planetary gear system 752B disposed at the outboard end of the axle half shaft 710. A plurality of planet gears 756B are in meshed engagement with the third sun gear 754B, and are driven thereby. The planet gears 756B are also in meshed engagement with a third planetary ring gear 758B. The third planetary ring gear 738B is a non-rotating gear element which may comprise a portion of the stationary housing or an independent component fixedly coupled with the stationary housing. Additionally, the planet gears 756B are carried by a planet carrier 760B. The planet carrier 760B is coupled for rotation with a stub shaft 762B.

Figure 10:
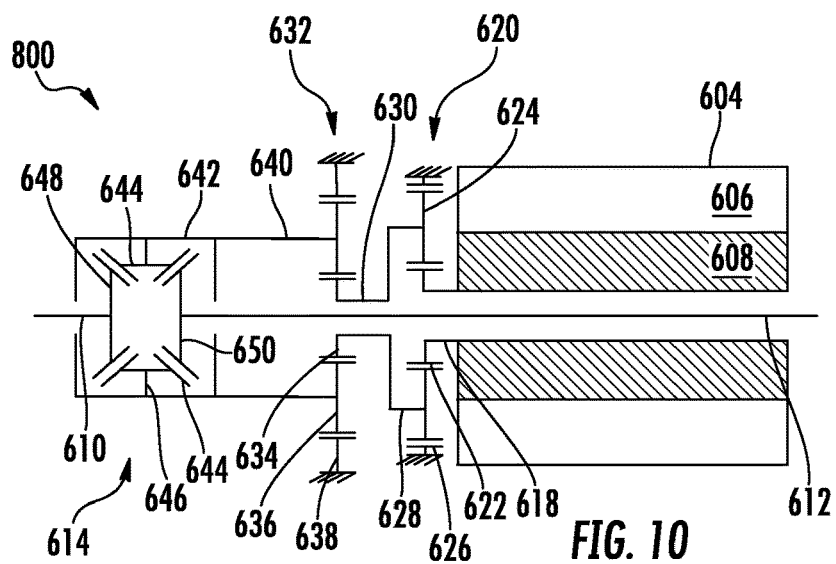
FIG. 10 schematically depicts a one-speed electric drive axle system according to another embodiment of the presently disclosed subject matter.

As illustrated in FIG. 10, an embodiment of a one-speed electric drive axle 800 may comprise an integrated drive system. The electric drive axle 800 is another variant of the electric drive axle 600 depicted in FIG. 8. The difference between the electric drive axle 600 and the electric drive axle 800 is that the wheel end planetary gear systems have been eliminated. A person having skill in the art can readily appreciate that this results in no speed reduction at the wheel ends. As illustrated in FIG. 10, components shared by the electric drive axles 600 and 800 are given like reference numbers.

Figure 11:
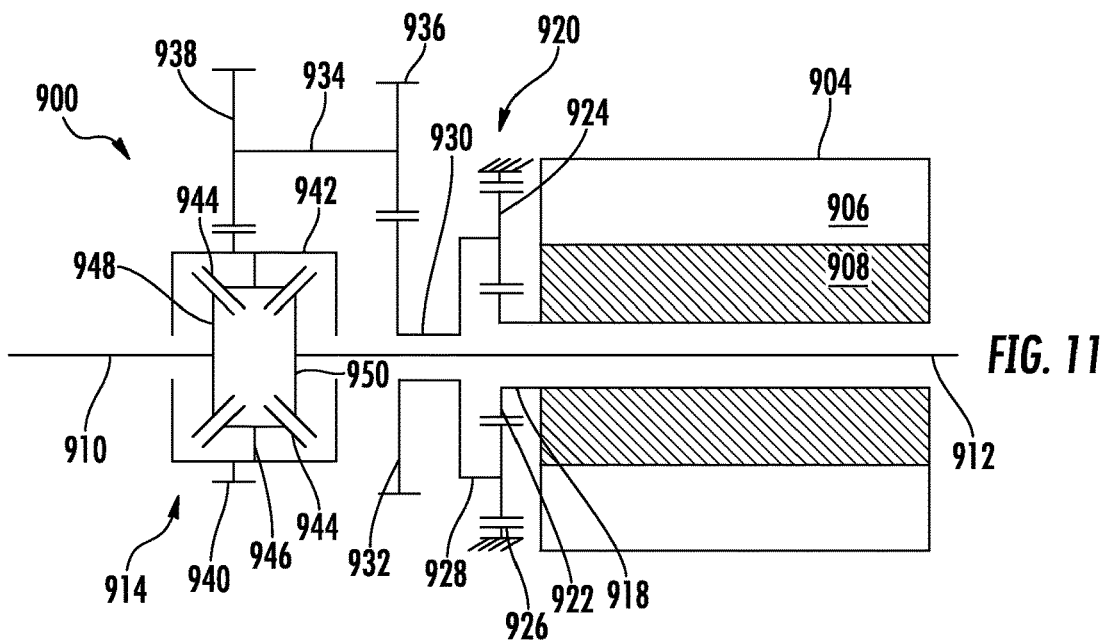
FIG. 11 schematically depicts a one-speed electric drive axle system according to another embodiment of the presently disclosed subject matter.

As illustrated in FIG. 11, an embodiment of a one-speed electric drive axle 900 may comprise an integrated drive system. The electric drive axle 900 includes an electric motor 904 that is radially concentric with one of a pair of axle half shafts 910, 912 extending from a differential 914. The electric motor 904 comprises a stator 906 and a rotor 908. Additionally, the electric drive axle 900 may comprise an inverter (not depicted) for converting direct current to alternating current when the electric motor 904 is utilized to drive the vehicle, and for converting alternating current to direct current when the vehicle decelerates.

The electric drive axle 900 comprises a single planetary gear system 920. A driving shaft 918 is coupled with the rotor 908 for rotation therewith. In an embodiment, the driving shaft 918 is coupled for rotation with a sun gear 922 disposed at an inboard end thereof. The sun gear 922 inputs driving rotation to a planetary gear system 920. A plurality of planet gears 924 are in meshed engagement with the sun gear 922, and are driven thereby. The planet gears 924 are also in meshed engagement with a planetary ring gear 926. The planetary ring gear 926 comprises a stationary housing portion. In another embodiment, the planetary ring gear 926 may be an independent component fixedly coupled with the stationary housing.

In addition, the planet gears 924 are carried by a planet carrier 928. The planet carrier 928 comprises a driven shaft 930 concentrically disposed about the axle half shaft 912. The driven shaft 930 is coupled with a driven gear 932 also concentrically disposed about the axle half shaft 912. Additionally, the driven gear 932 is disposed at an end of the driven shaft 930 opposite the planet gears 924. A layshaft 934 is disposed generally parallel to the axle half shaft 910, 912. The layshaft 934 includes an input gear 936 disposed thereon and in meshed engagement with the driven gear 932. A layshaft output gear 938 is also disposed on the layshaft 934 at an inboard end thereof. The layshaft output gear 938 is coupled for rotation with the layshaft 934 and in meshed engagement with a drive gear 940.

The drive gear 940 is fixedly coupled with a differential case 942. The differential case 942 is rotatably driven via the drive gear 940. Two or more differential pinions 944 are coupled within the differential case 942 via a pinion shaft 946 (i.e., spider shaft). In an embodiment, the pinion shaft 946 may comprise a cross member. The differential pinions 944 are in meshed engagement with a pair of side gears 948, 950. The side gears 948, 950 are coupled for rotation with the drive axle half shafts 910, 912, respectively.

In this embodiment, the layshaft 934 provides a second speed reducer/increaser coupled with the planetary gear system 920. As illustrated in FIG. 11, the layshaft 934 reduction gear set is comprised of two gears 936, 938, but a greater or fewer number of gears may be utilized to produce a predetermined speed through the gear set.

Figure 12:
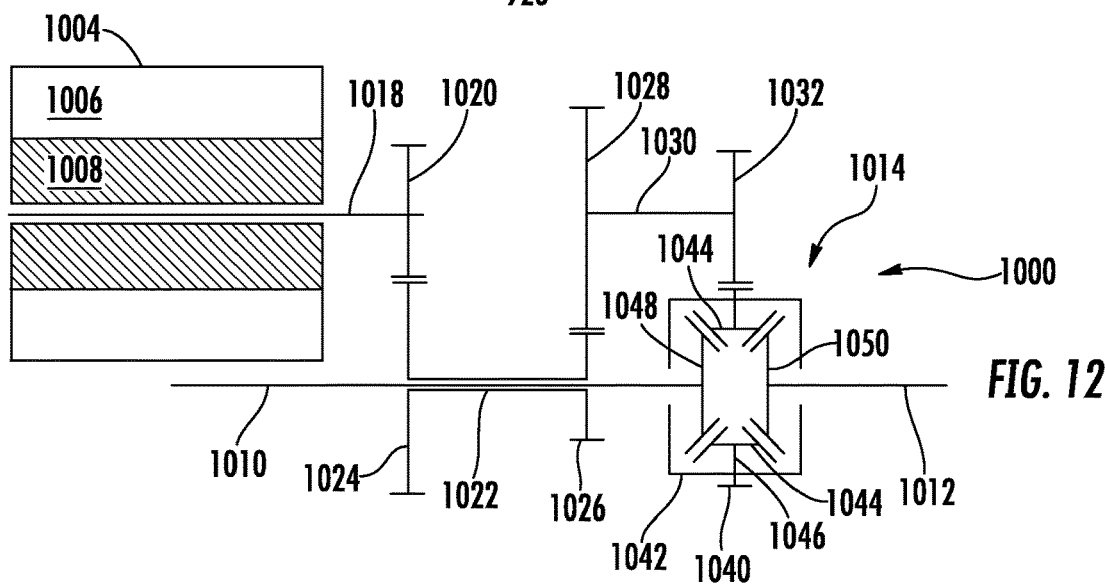
FIG. 12 schematically depicts a one-speed electric drive axle system according to another embodiment of the presently disclosed subject matter.

Referring now to FIG. 12, an embodiment of a one-speed electric drive axle 1000 comprising an integrated drive system is depicted. The electric drive axle 1000 includes an electric motor 1004 that is disposed offset from of a pair of axle half shafts 1010, 1012 extending from a differential apparatus 1014. The electric motor 1004 comprises a stator 1006 and a rotor 1008. Additionally, the electric drive axle 1000 may comprise an inverter (not depicted) for converting direct current to alternating current when the electric motor 1004 is utilized to drive the vehicle, and for converting alternating current to direct current when the vehicle decelerates.

A driving shaft 1018 is coupled with the rotor 1008 for rotation therewith. A driving gear 1020 is disposed on the driving shaft 1018 at an inboard end thereof. The driving gear 1020 is in driving engagement with a driven shaft 1022 via meshed engagement with a first driven gear 1024 disposed on the driven shaft 1022. The driven shaft 1022 is disposed concentrically about the axle half shaft 1010. A second driven gear 1026 is disposed on the driven shaft 1022 opposite the first driven gear 1024. The second driven gear 1026 is coupled with the driven shaft 1022 for rotation therewith.

The second driven gear 1026 is in meshed engagement with a first layshaft gear 1028. The first layshaft gear 1028 is disposed on a layshaft 1030 offset from the axle half shaft 1010, 1012. The first layshaft gear 1028 is coupled with the layshaft 1030 for rotation therewith. In an embodiment, the layshaft 1030 may be disposed coaxially with the driving shaft 1018. A second layshaft gear 1032 is disposed on the layshaft 1030 opposite the first layshaft gear 1028, and is coupled with the layshaft 1030 for rotation therewith. The second layshaft gear 1032 is in meshed engagement with a drive gear 1040.

The drive gear 1040 is fixedly coupled with a differential case 1042. The differential case 1042 is rotatably driven via the drive gear 1040. Two or more differential pinions 1044 are coupled within the differential case 1042 via a pinion shaft 1046 (i.e., spider shaft). In an embodiment, the pinion shaft 1046 may comprise a cross member. The differential pinions 1044 are in meshed engagement with a pair of side gears 1048, 1050. The side gears 1048, 1050 are coupled for rotation with the drive axle half shafts 1010, 1012, respectively.

In the electric drive axle 1000, the electric motor 1004 drives a three gear reduction set 1020-1024, 1026-1028, 1032-1040 wherein the final gear 1040 is connected to the differential case 1042. In this embodiment, the layshaft 1030 and the electric motor 1004 are not disposed concentric with either axle half shaft 1010, 1012. Instead, the electric motor 1004 and the layshaft 1030 are offset from the axle half shafts 1010, 1012.

Figure 13:
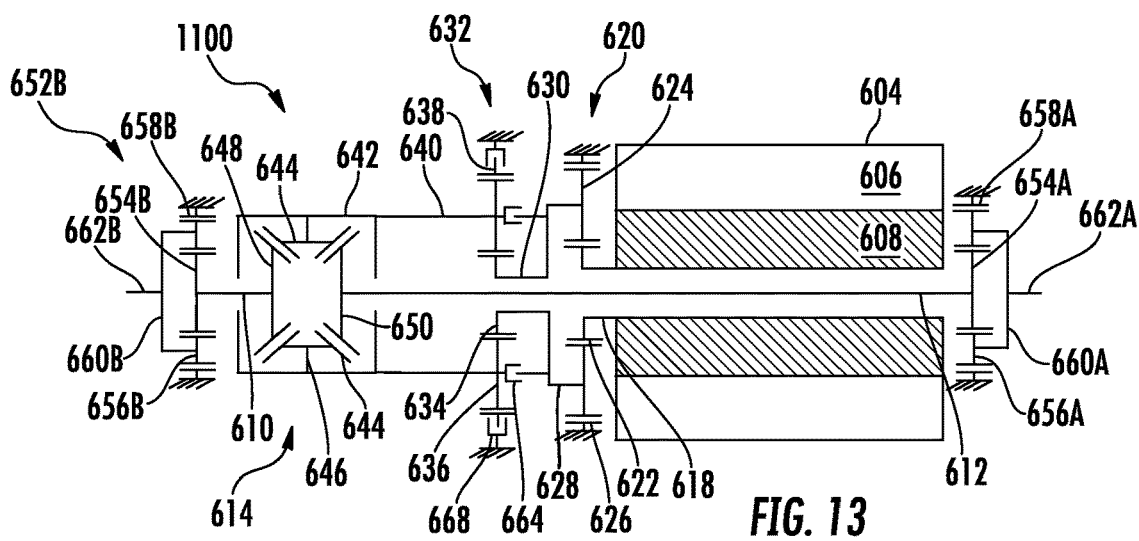
FIG. 13 schematically depicts a two-speed electric drive axle system according to an embodiment of the presently disclosed subject matter.

As illustrated in FIG. 13, an embodiment of a two-speed electric drive axle 1100 may comprise an integrated drive system. The electric drive axle 1100 is a two-speed variant of the electric drive axle 600 depicted in FIG. 8. As illustrated in FIG. 13, components shared by the electric drive axles 600 and 1100 are given like reference numbers.

The electric drive axle 1100 comprises a two-speed electric drive axle system having the three planetary gear systems 620, 632, and 652A, 652B described in relation to the electric drive axle 600. Additionally, the electric drive axle 1100 comprises first and second engagement elements 664, 668. The first engagement element 664 is disposed on the second planet carrier 640 for selectively engaging the second planet carrier 640 and the first planet carrier 628. In an embodiment, the first engagement element 664 may comprise a synchronizer apparatus. In another embodiment, the first engagement element 664 may comprise a dog clutch. In yet other embodiments, the first engagement element 664 may comprise any shift element suitable for selectively engaging the second planet carrier 640 with the first planet carrier 628. The first engagement element 664 may also be disposed on the first planet carrier 628 for selectively engaging the first planet carrier 628 with the second planet carrier 640. The first engagement element 664 selectively connects/disconnects the first planetary gear system 620 and the second planetary gear system 632.

A second engagement element 668 is coupled with a stationary housing portion of the electric drive axle 1100. The second engagement element 668 selectively engages the planetary ring gear 638 to provide a source for ground for the second planetary gear system 632. The second engagement element 668 may comprise any shift element suitable for selectively engaging the stationary housing and the planetary ring gear 638. In an embodiment, the second engagement element 668 may comprise a multi-plate clutch. In another embodiment, the second engagement element 668 may comprise a dog clutch.

In a first speed reduction mode, the first engagement element 664 is operative to couple the first planet carrier 628 and the second planet carrier 640, and the second engagement element 668 is inoperative such that the planetary ring gear 638 rotates with the plurality of planet gears 636. In the first speed reduction mode, the first planet carrier 628 drives the second planet carrier without a reduction through the second planetary gear system 632.

In a second speed reduction mode, the first engagement element 664 is inoperative such that the first planet carrier 628 does not drive the second planet carrier 640, and the second engagement element 668 is operative to lock the planetary ring gear 638 to the stationary housing. In the second speed reduction mode, the first planet carrier 628 drives the driven shaft 630 which drive the sun gear 634, and the sun gear 634 drives the plurality of planet gears 636 within the planetary ring gear 638 producing a reduction through the second planetary gear system 632.

If both the first and second engagement elements 664, 668 are simultaneously engaged, the electric drive axle 1100 becomes locked and there is not rotation to the axle half shafts 610, 612. Simultaneously engaging the first and second engagement elements 610, 612 may be utilized as a parking brake, or as a supplement to a conventional parking brake.

Figure 14:
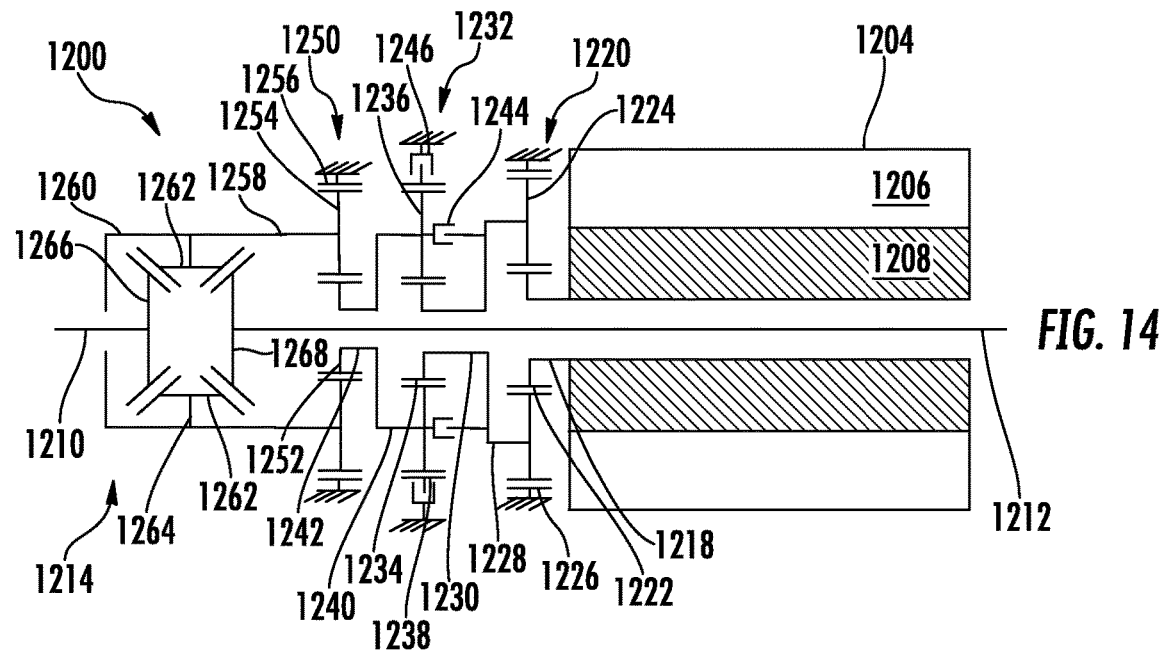
FIG. 14 schematically depicts a two-speed electric drive axle system according to another embodiment of the presently disclosed subject matter.

As illustrated in FIG. 14, an embodiment of a one-speed electric drive axle 1200 may comprise an integrated drive system. The electric drive axle 1200 includes an electric motor 1204 that is radially concentric with one of a pair of axle half shafts 1210, 1212 extending from a differential 1214. The electric motor 1204 comprises a stator 1206 and a rotor 1208. Additionally, the electric drive axle 1200 may comprise an inverter (not depicted) for converting direct current to alternating current when the electric motor 1204 is utilized to drive the vehicle, and for converting alternating current to direct current when the vehicle decelerates.

A driving shaft 1218 is coupled with the rotor 1208 for rotation therewith. The driving shaft 1218 is disposed concentrically about the axle half shaft 1212. The electric drive axle 1200 includes three planetary gear systems. A first planetary gear system 1220 is provided inboard of the electric motor 1204, and is disposed concentric with the axle half shaft 1212. The driving shaft 1218 is coupled for rotation with a first sun gear 1222 disposed at an inboard end thereof. The first sun gear 1222 provides an input to the first planetary gear system 1220. A plurality of planet gears 1224 are in meshed engagement with the sun gear 1222, and are driven thereby. The planet gears 1224 are also in meshed engagement with a planetary ring gear 1226. The planetary ring gear 1226 may comprise a portion of a stationary housing or may be an independent component fixedly coupled with the stationary housing. As illustrated in FIG. 14, the planetary ring gear 1226 is a fixed (i.e., non-rotating) component. Additionally, the planet gears 1224 are carried by a planet carrier 1228. The planet carrier 1228 comprises a driven shaft 1230 disposed concentrically about the axle half shaft 1212.

A second planetary gear system 1232 is provided between the differential 1214 and the first planetary gear system 1220, and disposed concentrically about the axle half shaft 1212. The second planetary gear system 1232 comprises a second sun gear 1234 coupled with an end of the driven shaft 1230. The second sun gear 1234 inputs a driving force to the second planetary gear system 1232. A plurality of planet gears 1236 are in meshed engagement with the second sun gear 1234, and are driven thereby. The planet gears 1236 are also in meshed engagement with a second planetary ring gear 1238. The second planetary ring gear 1238 is a non-rotating gear element which may comprise a portion of a stationary housing or an independent component fixedly coupled with the stationary housing. Additionally, the planet gears 1236 are carried by a second planet carrier 1240. The second planet carrier 1240 comprises a second driven shaft 1242 disposed concentrically about the axle half shaft 1212.

Additionally, the electric drive axle 1200 comprises first and second engagement elements 1244, 1246. The first engagement element 1244 is disposed on the second planet carrier 1240 for selectively engaging the second planet carrier 1240 and the first planet carrier 1228. In an embodiment, the first engagement element 1244 may comprise a synchronizer apparatus. In another embodiment, the first engagement element 1244 may comprise a dog clutch. In yet other embodiments, the first engagement element 1244 may comprise any shift element suitable for selectively engaging the second planet carrier 1240 with the first planet carrier 1228. The first engagement element 1244 may also be disposed on the first planet carrier 1228 for selectively engaging the first planet carrier 1228 with the second planet carrier 1240. The first engagement element 1244 selectively connects/disconnects the first planetary gear system 1220 and the second planetary gear system 1232.

A second engagement element 1246 is coupled with a stationary housing portion of the electric drive axle 1200. The second engagement element 1246 selectively engages the second planetary ring gear 1238 to provide a source for ground for the second planetary gear system 1232. The second engagement element 1246 may comprise any shift element suitable for selectively engaging the stationary housing and the second planetary ring gear 1238. In an embodiment, the second engagement element 1246 may comprise a multi-plate clutch. In another embodiment, the second engagement element 1246 may comprise a dog clutch.

A third planetary gear system 1250 is provided between the differential 1214 and the second planetary gear system 1232, and disposed concentrically about the axle half shaft 1212. The first, second, and third planetary gear systems 1220, 1232, 1250 function to provide a large speed reduction between the differential 1214 and the electric motor 1204. The third planetary gear system 1250 comprises a third sun gear 1252 coupled with an end of the driven shaft 1242. The third sun gear 1252 inputs a driving force to the third planetary gear system 1250. A plurality of planet gears 1254 are in meshed engagement with the third sun gear 1252, and are driven thereby. The planet gears 1254 are also in meshed engagement with a third planetary ring gear 1256. The third planetary ring gear 1256 is a non-rotating gear element which may comprise a portion of a stationary housing or an independent component fixedly coupled with the stationary housing. Additionally, the planet gears 1254 are carried by a third planet carrier 1258 coupled for rotation with a differential case 1260.

The differential case 1260 is rotatably driven via the third planet carrier 1258. Two or more differential pinions 1262 are coupled within the differential case 1260 via a pinion shaft 1264 (i.e., spider shaft). In an embodiment, the pinion shaft 1264 may comprise a cross member. The differential pinions 1262 are in meshed engagement with a pair of side gears 1266, 1268. The side gears 1266, 1268 are coupled for rotation with the drive axle half shafts 1210, 1212, respectively.

In a first speed reduction mode, the first engagement element 1244 is operative to couple the first planet carrier 1228 and the second planet carrier 1240, and the second engagement element 1246 is inoperative such that the planetary ring gear 1238 rotates with the plurality of planet gears 1236. In the first speed reduction mode, the first planet carrier 1228 drives the second planet carrier 1240 without a reduction through the second planetary gear system 1232.

In a second speed reduction mode, the first engagement element 1244 is inoperative such that the first planet carrier 1228 does not drive the second planet carrier 1240, and the second engagement element 1246 is operative to lock the second planetary ring gear 1238 to the stationary housing. In the second speed reduction mode, the first planet carrier 1228 drives the driven shaft 1230 which drives the sun gear 1234, and the sun gear 1234 drives the plurality of planet gears 1236 within the planetary ring gear 1238 producing a reduction through the second planetary gear system 1232.

If both the first and second engagement elements 1244, 1246 are simultaneously engaged, the electric drive axle 1200 becomes locked and there is not rotation to the axle half shafts 1210, 1212. Simultaneously engaging the first and second engagement elements 1244, 1246 may be utilized as a parking brake, or as a supplement to a conventional parking brake.

Figure 15:
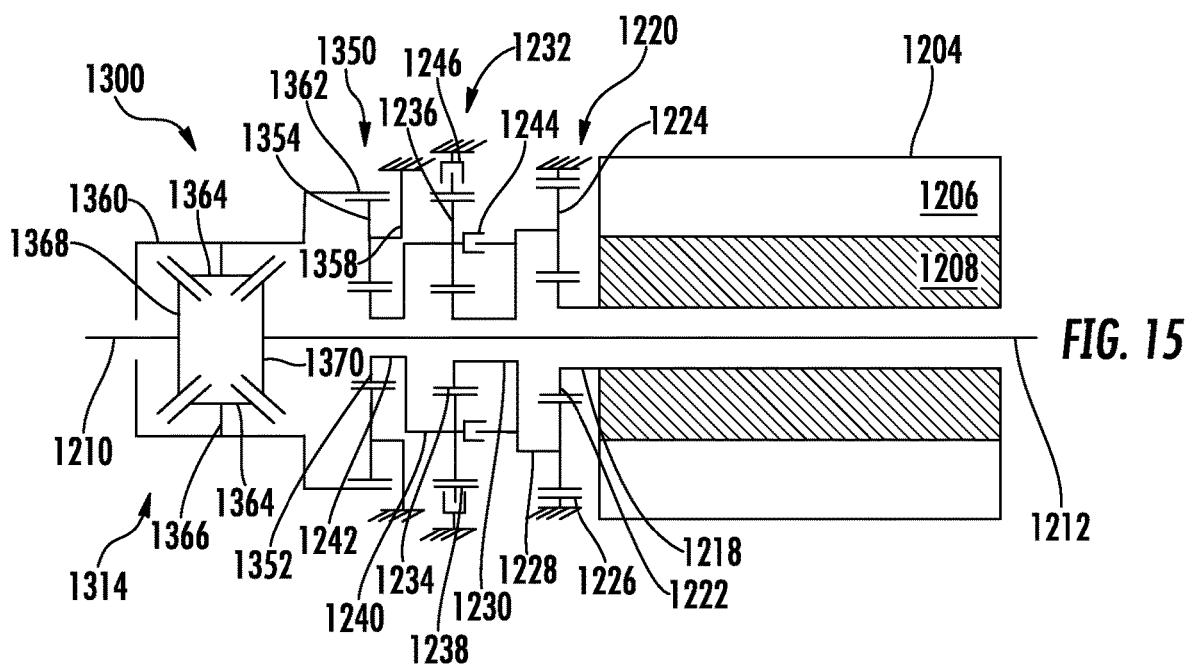
FIG. 15 schematically depicts a two-speed electric drive axle system according to another embodiment of the presently disclosed subject matter.

As illustrated in FIG. 15, an embodiment of a two-speed electric drive axle 1300 may comprise an integrated drive system. The electric drive axle 1300 is a variant of the electric drive axle 1200 depicted in FIG. 14. As illustrated in FIG. 15, components shared by the electric drive axles 1200 and 1300 are given like reference numbers.

The electric drive axle 1300 comprises a two-speed electric drive axle system having three planetary gear systems 1220, 1232, and 1350. The third planetary gear system 1350 is provided between the differential 1314 and the second planetary gear system 1232, and disposed concentrically about the axle half shaft 1212. The first, second, and third planetary gear systems 1220, 1232, 1350 function to provide a large speed reduction between the differential 1314 and the electric motor 1204. The third planetary gear system 1350 comprises a third sun gear 1352 coupled with an end of the driven shaft 1242. The third sun gear 1352 inputs a driving force to the third planetary gear system 1350. A plurality of planet gears 1354 are in meshed engagement with the third sun gear 1352, and are driven thereby. The planet gears 1354 are carried by a third planet carrier 1358 attached to ground. In an embodiment, the third planet carrier 1358 is fixedly coupled with the stationary housing of the electric drive axle 1300.

The planet gears 1354 are also in meshed engagement with a differential case 1360 comprising an integrated planetary ring gear 1362. The third planetary ring gear 1356 is a rotatable component of the third planetary gear system 1350 which drives the differential case 1360. In an embodiment, the third planetary ring gear 1356 may comprise an outer diameter greater than the outer diameter of the other portions of the differential case 1360.

The differential case 1360 is rotatably driven via the third planetary ring gear 1362. Two or more differential pinions 1364 are coupled within the differential case 1360 via a pinion shaft 1366 (i.e., spider shaft). In an embodiment, the pinion shaft 1366 may comprise a cross member. The differential pinions 1364 are in meshed engagement with a pair of side gears 1368, 1370. The side gears 1368, 1370 are coupled for rotation with the drive axle half shafts 1210, 1212, respectively.

Figure 16:
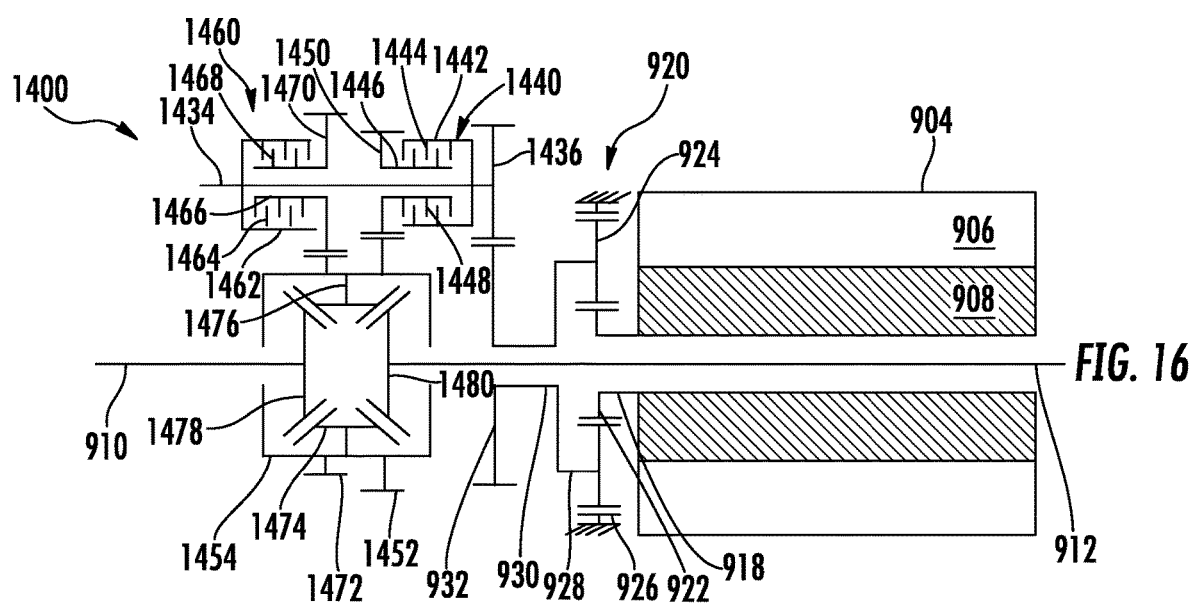
FIG. 16 schematically depicts a two-speed electric drive axle system according to another embodiment of the presently disclosed subject matter.

As illustrated in FIG. 16, an embodiment of a two-speed electric drive axle 1400 may comprise an integrated drive system. The electric drive axle 1400 is a two-speed variant of the electric drive axle 900 depicted in FIG. 11. As illustrated in FIG. 16, components shared by the electric drive axles 900 and 1400 are given like reference numbers.

The electric drive axle 1400 comprises a two-speed electric drive axle system having a single planetary gear system 920 as described in relation to the electric drive axle 900. Additionally, the electric drive axle 1400 comprises a layshaft 1434 having first and second engagement elements 1440, 1460. In an embodiment, as illustrated in FIG. 16, the first and second engagement elements 1440, 1460 may comprise a wet clutch powershift design such that during the engagement/disengagement of the first and second engagement elements 1440, 1460 torque can be transferred without a power drop to zero. In another embodiment, not depicted, the first and second engagement elements 1440, 1460 may comprise a synchronizer system. In still another embodiment, the first and second engagement elements 1440, 1460 may comprise a first and second dog clutch. The first and second engagement elements 1440, 1460 may be referred to herein as a shift element.

Referring now to FIG. 16, the layshaft 1434 is disposed generally parallel to the axle half shafts 910, 912. The layshaft 1434 includes an input gear 1436 disposed thereon and in meshed engagement with the driven gear 932. The first engagement element 1440 is disposed concentric with the layshaft 1434 and adjacent to the input gear 1436. In an embodiment, the first engagement element 1440 comprises a clutch drum 1442 coupled with the layshaft 1434 for rotation therewith. The clutch drum 1442 comprises a plurality of radially inward extending clutch plates 1444. The clutch plates 1444 are coupled with the clutch drum 1442 for axial movement therealong.

The first engagement element 1440 also comprises a clutch hub 1446 concentrically disposed about the layshaft 1434. The clutch hub 1446 comprises a plurality of radially outward extending clutch plates 1448 interleaved with the clutch plates 1444. The clutch plates 1448 are connected to the clutch hub 1446 for axial movement therealong. The clutch hub 1446 is selectively rotatable with regard to the layshaft 1434. The clutch hub 1446 further comprises a hub gear 1450. The hub gear 1450 is in meshed engagement with a first gear 1452. The first gear 1452 is coupled for rotation with a differential case 1454.

The second engagement element 1460 is also disposed concentric with the layshaft 1434 adjacent to the first engagement element 1440. In an embodiment, the second engagement element 1460 comprises a clutch drum 1462 coupled with the layshaft 1434 for rotation therewith. The clutch drum 1462 comprises a plurality of radially inward extending clutch plates 1464. The clutch plates 1464 are coupled with the clutch drum 1462 for axial movement therealong.

The second engagement element 1460 also comprises a clutch hub 1466 concentrically disposed about the layshaft 1434. The clutch hub 1466 comprises a plurality of radially outward extending clutch plates 1468 interleaved with the clutch plates 1464. The clutch plates 1468 are connected to the clutch hub 1466 for axial movement therealong. The clutch hub 1466 is selectively rotatable with regard to the layshaft 1434. The clutch hub 1466 further comprises a hub gear 1470. The hub gear 1470 is in meshed engagement with a second gear 1472. The second gear 1472 is coupled for rotation with the differential case 1454.

The differential case 1454 is selectively driven via the first gear 1452 or the second gear 1472. Two or more differential pinions 1474 are coupled within the differential case 1454 via a pinion shaft 1476 (i.e., spider shaft). In an embodiment, the pinion shaft 1476 may comprise a cross member. The differential pinions 1474 are in meshed engagement with a pair of side gears 1478, 1480. The side gears 1478, 1480 are coupled for rotation with the drive axle half shafts 910, 912, respectively.

A first engagement element actuator (not depicted) selectively compresses the plurality of clutch plates 1444, 14448 in the first engagement element 1440 to lock the clutch plates 1444, 1448 together. Compression of the clutch plates 1444, 1448 causes them to rotate together. When the first engagement element actuator relaxes, or releases, the compression, the clutch plates 1444, 1448 rotate with respect to one another. The first engagement element actuator may be such as an electromagnetic actuator, a hydraulic actuator, a pneumatic actuator, or a mechanical actuator.

A second engagement element actuator (not depicted) selectively compresses the plurality of clutch plates 1464, 1468 in the second engagement element 1460 to lock them together. Compression of the clutch plates 1464, 1468 causes them to rotate together. When the second engagement element actuator relaxes, or releases, the compression, the clutch plates 1464, 1468 rotate with respect to one another. The second engagement element actuator may be such as an electromagnetic actuator, a hydraulic actuator, a pneumatic actuator, or a mechanical actuator. The first and second engagement element actuators work independently of one another.

The gear ratio of the second clutch hub gear 1470 and the second gear 1472 is different from the gear ratio of the first clutch hub gear 1450 and the first gear 1452. In a first speed reduction mode the first engagement element 1440 is closed and the second engagement element 1460 is open. In the first speed reduction mode rotation is provided through the layshaft 1434, through the first engagement element 1440 to the gear ratio defined by the clutch hub gear 1450 and the first gear 1452 on the differential case 1454. In a second speed reduction mode the second engagement element 1460 is closed and the first engagement element 1440 is open. In the second speed reduction mode rotation is provided through the layshaft 1434, through the second engagement element 1460 to the gear ratio defined by the clutch hub gear 1470 and the second gear 1472 on the differential case 1454.

In an embodiment, not disposed, a first layshaft gear and a second layshaft gear are disposed on the layshaft 1434. The first layshaft gear is in meshed engagement with the first drive gear 1452, and the second layshaft gear is in meshed engagement with the second drive gear 1472. In a first position, the shift element couples the first layshaft gear with the layshaft 1434 to transfer torque from the layshaft 1434 to the first drive gear 1452. In a second position, the shift element couples the second layshaft gear with the layshaft 1434 to transfer torque from the layshaft 1434 to the second drive gear 1472.

Figure 17:
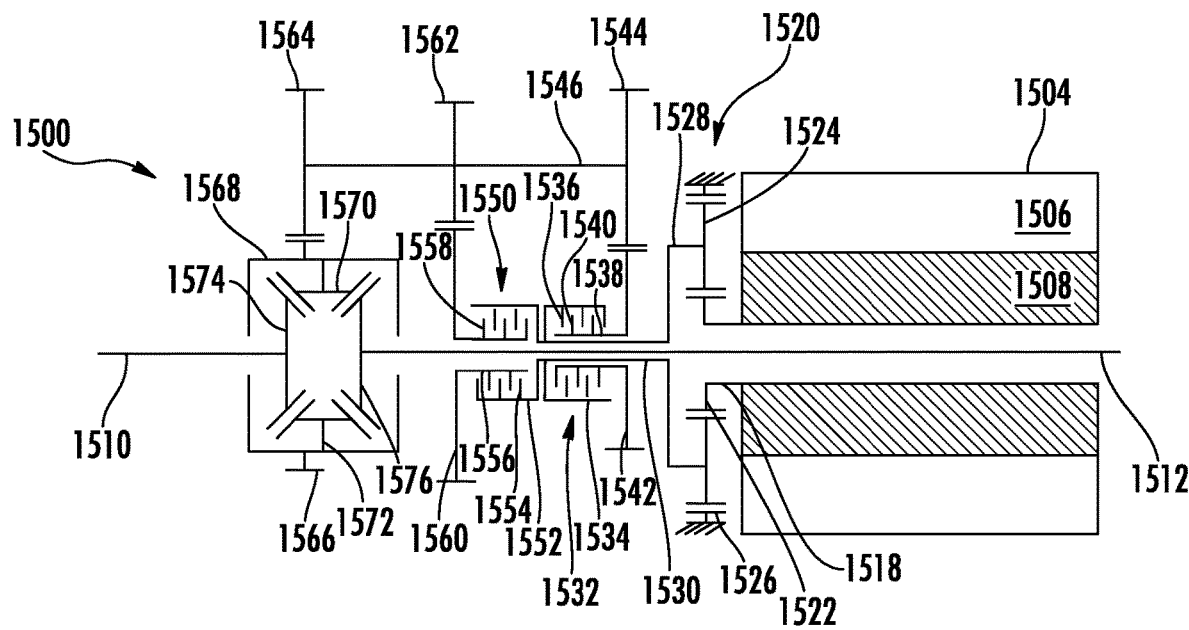
FIG. 17 schematically depicts a two-speed electric drive axle system according to another embodiment of the presently disclosed subject matter.

As illustrated in FIG. 17, an embodiment of a two-speed electric drive axle 1500 may comprise an integrated drive system. The electric drive axle 1500 includes an electric motor 1504 that is radially concentric with one of a pair of axle half shafts 1510, 1512 extending from a differential 1514. The electric motor 1504 comprises a stator 1506 and a rotor 1508. Additionally, the electric drive axle 1500 may comprise an inverter (not depicted) for converting direct current to alternating current when the electric motor 1504 is utilized to drive the vehicle, and for converting alternating current to direct current when the vehicle decelerates.

The electric drive axle 1500 comprises a single planetary gear system 1520. A driving shaft 1518 is coupled with the rotor 1508 for rotation therewith. The driving shaft 1518 is coupled for rotation with a sun gear 1522 disposed at an inboard end thereof. The sun gear 1522 inputs driving rotation to the planetary gear system 1520. A plurality of planet gears 1524 are in meshed engagement with the sun gear 1522, and are driven thereby. The planet gears 1524 are also in meshed engagement with a planetary ring gear 1526. The planetary ring gear 1526 may comprise a stationary housing portion or an independent component fixedly coupled with the stationary housing.

In addition, the planet gears 1524 are carried by a planet carrier 1528. The planet carrier 1528 comprises a driven shaft 1530 concentrically disposed about the axle half shaft 1512. A first engagement element 1532 is disposed concentric with the driven shaft 1530. In an embodiment, the first engagement element 1532 comprises a clutch drum 1534 coupled with the driven shaft 1530 for rotation therewith. The clutch drum 1534 comprises a plurality of radially inward extending clutch plates 1536. The clutch plates 1536 are coupled with the clutch drum 1534 for axial movement therealong.

The first engagement element 1532 also comprises a clutch hub 1538 concentrically disposed about the driven shaft 1530. The clutch hub 1538 comprises a plurality of radially outward extending clutch plates 1540 interleaved with the clutch plates 1536. The clutch plates 1540 are connected to the clutch hub 1538 for axial movement therealong. The clutch hub 1538 is selectively rotatable with regard to the driven shaft 1530. The clutch hub 1538 further comprises a hub gear 1542. The hub gear 1542 is in meshed engagement with a first layshaft gear 1544. The first layshaft gear 1544 is coupled for rotation with a layshaft 1546.

A second engagement element 1550 is also disposed concentric with the driven shaft 1530, and is located adjacent to the first engagement element 1532. In an embodiment, the second engagement element 1550 comprises a clutch drum 1552 coupled with the driven shaft 1530 for rotation therewith. The clutch drum 1552 comprises a plurality of radially inward extending clutch plates 1554. The clutch plates 1554 are coupled with the clutch drum 1552 for axial movement therealong.

The second engagement element 1550 also comprises a clutch hub 1556 concentrically disposed about the driven shaft 1530. The clutch hub 1556 comprises a plurality of radially outward extending clutch plates 1558 interleaved with the clutch plates 1554. The clutch plates 1558 are connected to the clutch hub 1556 for axial movement therealong. The clutch hub 1556 is selectively rotatable with regard to the driven shaft 1530. The clutch hub 1556 also comprises a hub gear 1560. The hub gear 1560 is in meshed engagement with a second layshaft gear 1562. The second layshaft gear 1562 is coupled for rotation with the layshaft 1546.

The layshaft 1546 is disposed offset from, and parallel with, the drive axle half shafts 1510, 1512. The layshaft 1546 comprises the first layshaft gear 1544 which is in meshed engagement with the first clutch hub gear 1542 to create a first gear ratio. The layshaft 1546 also comprises the second layshaft gear 1562 which is in meshed engagement with the second clutch hub gear 1560 to create a second gear ratio. The layshaft 1546 further comprises a third layshaft gear 1564 in meshed engagement with a gear 1566 coupled with a differential case 1568.

A first engagement element actuator (not depicted) selectively compresses the plurality of clutch plates 1536, 1540 in the first engagement element 1532 to lock the clutch plates 1536, 1540 together. Compression of the clutch plates 1536, 1540 causes them to rotate together. When the first engagement element actuator relaxes, or releases, the compression, the clutch plates 1536, 1540 rotate with respect to one another. The first engagement element actuator may be such as an electromagnetic actuator, a hydraulic actuator, a pneumatic actuator, or a mechanical actuator.

A second engagement element actuator (not depicted) selectively compresses the plurality of clutch plates 1554, 1558 in the second engagement element 1550 to lock them together. Compression of the clutch plates 1554, 1558 causes them to rotate together. When the second engagement element actuator relaxes, or releases, the compression, the clutch plates 1554, 1558 rotate with respect to one another. The second engagement element actuator may be such as an electromagnetic actuator, a hydraulic actuator, a pneumatic actuator, or a mechanical actuator. The first and second engagement element actuators work independently of one another.

In a first speed reduction mode the first engagement element 1532 is closed and the second engagement element 1550 is open. In the first speed reduction mode, rotation is provided through the planetary gear system 1520, through the first engagement element 1532, through the first gear ratio defined by the first clutch hub gear 1542 and the first layshaft gear 1544, and through the third layshaft gear 1564 to the gear 1566 on the differential case 1568. In a second speed reduction mode the second engagement element 1550 is closed and the first engagement element 1532 is open. In the second speed reduction mode, rotation is provided through the planetary gear system 1520, through the second engagement element 1550, through the second gear ratio defined by the second clutch hub gear 1560 and the second layshaft gear 1562, and through the third layshaft gear 1564 to the drive gear 1566 on the differential case 1568.

The differential case 1568 is driven via the third layshaft gear 1564. Two or more differential pinions 1570 are coupled within the differential case 1568 via a pinion shaft 1572 (i.e., spider shaft). In an embodiment, the pinion shaft 1572 may comprise a cross member. The differential pinions 1570 are in meshed engagement with a pair of side gears 1574, 1576. The side gears 1574, 1576 are coupled for rotation with the drive axle half shafts 1510, 1512, respectively.

In another embodiment, not depicted, the first and second engagement elements 1532, 1550 may comprise a synchronizer system. In still another embodiment, the first and second engagement elements 1532, 1550 may comprise a first and second dog clutch. The first and second engagement elements 1532, 1550 may be referred to herein as a shift element. In an embodiment, not depicted, a first driving gear and a second driving gear are disposed on the driven shaft 1530. The first driving gear is in meshed engagement with the first layshaft gear 1544, and the second driving gear is in meshed engagement with the second layshaft gear 1562. In a first position, the shift element couples the first driving gear with the driven shaft 1530 to transfer torque from the driven shaft 1530 to the first layshaft gear 1544. In a second position, the shift element couples the second driving gear with the driven shaft 1530 to transfer torque from the driven shaft 1530 to the second layshaft gear 1562.

Figure 18:
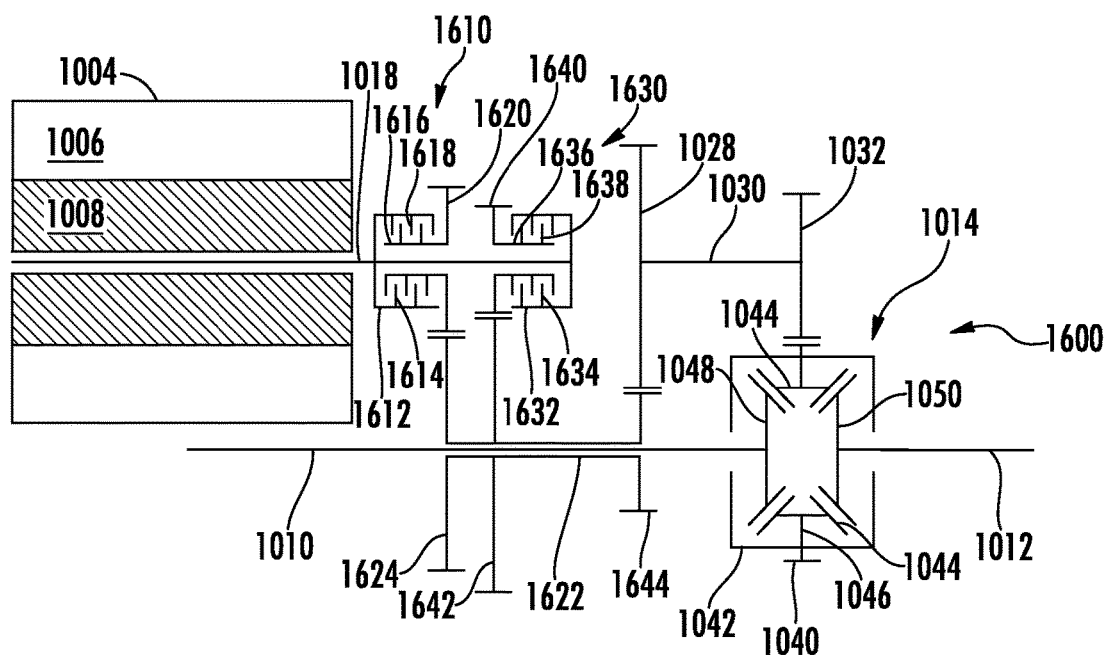
FIG. 18 schematically depicts a two-speed electric drive axle system according to another embodiment of the presently disclosed subject matter.

As illustrated in FIG. 18, an embodiment of a two-speed electric drive axle 1600 may comprise an integrated drive system. The electric drive axle 1600 is a two-speed variant of the electric drive axle 1000 depicted in FIG. 12. As illustrated in FIG. 18, components shared by the electric drive axles 1600 and 1000 are given like reference numbers.

The electric drive axle 1600 includes an electric motor 1004 that is disposed offset from of a pair of axle half shafts 1010, 1012 extending from a differential 1014. The electric motor 1004 comprises a stator 1006 and a rotor 1008. Additionally, the electric drive axle 1600 may comprise an inverter (not depicted) for converting direct current to alternating current when the electric motor 1004 is utilized to drive the vehicle, and for converting alternating current to direct current when the vehicle decelerates.

A driving shaft 1018 is coupled with the rotor 1008 for rotation therewith. A first engagement element 1610 is disposed concentric with the driving shaft 1018. In an embodiment, the first engagement element 1610 comprises a clutch drum 1612 coupled with the driving shaft 1018 for rotation therewith. The clutch drum 1612 comprises a plurality of radially inward extending clutch plates 1614. The clutch plates 1614 are coupled with the clutch drum 1612 for axial movement therealong.

The first engagement element 1610 also comprises a clutch hub 1616 concentrically disposed about the driving shaft 1018. The clutch hub 1616 comprises a plurality of radially outward extending clutch plates 1618 interleaved with the clutch plates 1614. The clutch plates 1618 are connected to the clutch hub 1616 for axial movement therealong. The clutch hub 1616 is selectively rotatable with regard to the driving shaft 1018. The clutch hub 1616 further comprises a hub gear 1620. The hub gear 1620 is in meshed engagement with a first driven gear 1624. The first driven gear 1624 is coupled for rotation with a driven shaft 1622.

A second engagement element 1630 is also disposed concentric with the driving shaft 1018, and is located adjacent to the first engagement element 1610. In an embodiment, the second engagement element 1630 comprises a clutch drum 1632 coupled with the driving shaft 1018 for rotation therewith. The clutch drum 1632 comprises a plurality of radially inward extending clutch plates 1634. The clutch plates 1634 are coupled with the clutch drum 1632 for axial movement therealong.

The second engagement element 1630 also comprises a clutch hub 1636 concentrically disposed about the driving shaft 1018. The clutch hub 1636 comprises a plurality of radially outward extending clutch plates 1638 interleaved with the clutch plates 1618. The clutch plates 1638 are connected to the clutch hub 1636 for axial movement therealong. The clutch hub 1636 is selectively rotatable with regard to the driving shaft 1018. The clutch hub 1636 also comprises a hub gear 1640. The hub gear 1640 is in meshed engagement with a second driven gear 1642. The second driven gear 1642 is coupled for rotation with the driven shaft 1622.

The driven shaft 1622 is disposed concentrically about the drive axle half shaft 1010. The driven shaft 1622 comprises the first driven gear 1624 which is in meshed engagement with the first clutch hub gear 1620 to create a first gear ratio. The driven shaft 1622 also comprises the second driven gear 1642 which is in meshed engagement with the second clutch hub gear 1640 to create a second gear ratio. A third driven gear 1644 is coupled with the driven shaft 1622 for rotation therewith. The third driven gear 1644 is in meshed engagement with a first layshaft gear 1028 coupled with a layshaft 1030 for rotation therewith.

The layshaft 1030 is disposed offset from, and parallel to, the axle half shafts 1010, 1012. The first layshaft gear 1028 is coupled with the layshaft 1030 for rotation therewith. In an embodiment, the layshaft 1030 may be disposed coaxially with the driving shaft 1018. A second layshaft gear 1032 is disposed on the layshaft 1030 opposite the first layshaft gear 1028, and is coupled with the layshaft 1030 for rotation therewith. The second layshaft gear is in meshed engagement with a drive gear 1040.

The drive gear 1040 is fixedly coupled with a differential case 1042. The differential case 1042 is rotatably driven via the drive gear 1040. Two or more differential pinions 1044 are coupled within the differential case 1042 via a pinion shaft 1046 (i.e., spider shaft). In an embodiment, the pinion shaft 1046 may comprise a cross member. The differential pinions 1044 are in meshed engagement with a pair of side gears 1048, 1050. The side gears 1048, 1050 are coupled for rotation with the drive axle half shafts 1010, 1012, respectively.

A first engagement element actuator (not depicted) selectively compresses the plurality of clutch plates 1614, 1618 in the first engagement element 1610 to lock the clutch plates 1614, 1618 together. Compression of the clutch plates 1614, 1618 causes them to rotate together. When the first engagement element actuator relaxes, or releases, the compression, the clutch plates 1614, 1618 rotate with respect to one another. The first engagement element actuator may be such as an electromagnetic actuator, a hydraulic actuator, a pneumatic actuator, or a mechanical actuator.

A second engagement element actuator (not depicted) selectively compresses the plurality of clutch plates 1634, 1638 in the second engagement element 1630 to lock them together. Compression of the clutch plates 1634, 1638 causes them to rotate together. When the second engagement element actuator relaxes, or releases, the compression, the clutch plates 1634, 1638 rotate with respect to one another. The second engagement element actuator may be such as an electromagnetic actuator, a hydraulic actuator, a pneumatic actuator, or a mechanical actuator. The first and second engagement element actuators work independently of one another.

In a first speed reduction mode the first engagement element 1610 is closed and the second engagement element 1630 is open. In the first speed reduction mode, rotation is provided through the driving shaft 1018, through the first engagement element 1610, through the first gear ratio defined by the first clutch hub gear 1620 and the first driven gear 1624, through the third driven gear 1644 and the first layshaft gear 1028, and through the second layshaft gear 1032 to the drive gear 1040 and the differential 1014. In a second speed reduction mode the second engagement element 1630 is closed and the first engagement element 1610 is open. In the second speed reduction mode, rotation is provided through the driving shaft 1018, through the second engagement element 1630, through the second gear ratio defined by the second clutch hub gear 1640 and the second driven gear 1642, through the third driven gear 1644 and the first layshaft gear 1028, and through the second layshaft gear 1032 to the drive gear 1040 and the differential 1014.

In another embodiment, not depicted, the first and second engagement elements 1610, 1630 may comprise a synchronizer system. In still another embodiment, the first and second engagement elements 1610, 1630 may comprise a first and second dog clutch. The first and second engagement elements 1610, 1630 may be referred to herein as a shift element. In an embodiment, not disposed, a first driving gear and a second driving gear are disposed on the driving shaft 1018. The first driving gear is in meshed engagement with the first driven gear 1624, and the second driving gear is in meshed engagement with the second driven gear 1642. In a first position, the shift element couples the first driving gear with the driving shaft 1018 to transfer torque from the driving shaft 1018 to the first driven gear 1624. In a second position, the shift element couples the second driving gear with the driving shaft 1018 to transfer torque from the driving shaft 1018 to the second driven gear 1642.

Figure 19:
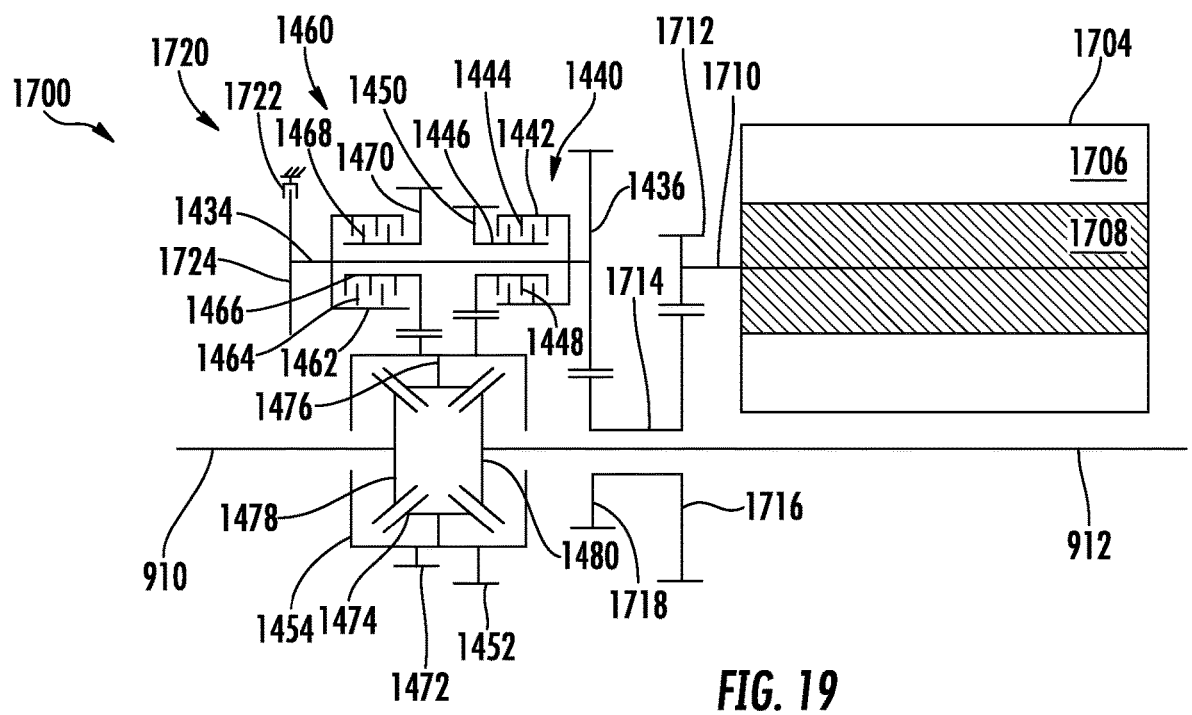
FIG. 19 schematically depicts a two-speed electric drive axle system according to another embodiment of the presently disclosed subject matter.

As illustrated in FIG. 19, an embodiment of a two-speed electric drive axle 1700 may comprise an integrated drive system. The electric drive axle 1700 is a variant of the electric drive axle 1400 depicted in FIG. 16. The electric drive axle 1700 does not include a reduction through a planetary gear system between the electric motor 904 and the differential case 1454. However, the electric drive axle 1700 may include a parking brake 1720. As illustrated in FIG. 19, components shared by the electric drive axles 1700 and 1400 are given like reference numbers.

The electric drive axle 1700 comprises an electric motor/generator 1704 disposed offset from drive axle shafts 910, 912. The electric motor/generator comprises a stator 1706 and a rotor 1708. A driving shaft 1710 is disposed generally parallel with the drive axle shafts 910, 912, and is drivingly engaged with the rotor 1708. A driving gear 1712 is coupled with the driving shaft 1710 for rotation therewith.

The driving shaft 1710 transfers torque to driven shaft 1714 disposed concentrically about the drive axle shaft 912 via the meshed engagement of the driving gear 1712 and a first driven gear 1716. The first driven gear 1716 is coupled with the driven shaft 1714 for rotation therewith. A second driven gear 1718 is coupled with the driven shaft 1714 opposite the first driven gear 1716. The driven shaft 1714 transfers torque to a layshaft 1434 having first and second engagement elements 1440, 1460, via the meshed engagement of the second driven gear 1718 and a layshaft input gear 1436.

The layshaft 1434 is disposed generally parallel to the axle half shafts 910, 912. The first engagement element 1440 is disposed concentric with the layshaft 1434 and adjacent to the input gear 1436. In an embodiment, the first engagement element 1440 comprises a clutch drum 1442 coupled with the layshaft 1434 for rotation therewith. The clutch drum 1442 comprises a plurality of radially inward extending clutch plates 1444. The clutch plates 1444 are coupled with the clutch drum 1442 for axial movement therealong.

The first engagement element 1440 also comprises a clutch hub 1446 concentrically disposed about the layshaft 1434. The clutch hub 1446 comprises a plurality of radially outward extending clutch plates 1448 interleaved with the clutch plates 1444. The clutch plates 1448 are connected to the clutch hub 1446 for axial movement therealong. The clutch hub 1446 is selectively rotatable with regard to the layshaft 1434. The clutch hub 1446 further comprises a hub gear 1450. The hub gear 1450 is in meshed engagement with a first gear 1452. The first gear 1452 is coupled for rotation with a differential case 1454.

The second engagement element 1460 is also disposed concentric with the layshaft 1434 adjacent to the first engagement element 1440. In an embodiment, the second engagement element 1460 comprises a clutch drum 1462 coupled with the layshaft 1434 for rotation therewith. The clutch drum 1462 comprises a plurality of radially inward extending clutch plates 1464. The clutch plates 1464 are coupled with the clutch drum 1462 for axial movement therealong.

The second engagement element 1460 also comprises a clutch hub 1466 concentrically disposed about the layshaft 1434. The clutch hub 1466 comprises a plurality of radially outward extending clutch plates 1468 interleaved with the clutch plates 1464. The clutch plates 1468 are connected to the clutch hub 1466 for axial movement therealong. The clutch hub 1466 is selectively rotatable with regard to the layshaft 1434. The clutch hub 1466 further comprises a hub gear 1470. The hub gear 1470 is in meshed engagement with a second gear 1472. The second gear 1472 is coupled for rotation with the differential case 1454.

The differential case 1454 is selectively driven via the first gear 1452 or the second gear 1472. Two or more differential pinions 1474 are coupled within the differential case 1454 via a pinion shaft 1476 (i.e., spider shaft). In an embodiment, the pinion shaft 1476 may comprise a cross member. The differential pinions 1474 are in meshed engagement with a pair of side gears 1478, 1480. The side gears 1478, 1480 are coupled for rotation with the drive axle half shafts 910, 912, respectively.

A first engagement element actuator (not depicted) selectively compresses the plurality of clutch plates 1444, 14448 in the first engagement element 1440 to lock the clutch plates 1444, 1448 together. Compression of the clutch plates 1444, 1448 causes them to rotate together. When the first engagement element actuator relaxes, or releases, the compression, the clutch plates 1444, 1448 rotate with respect to one another. The first engagement element actuator may be such as an electromagnetic actuator, a hydraulic actuator, a pneumatic actuator, or a mechanical actuator.

A second engagement element actuator (not depicted) selectively compresses the plurality of clutch plates 1464, 1468 in the second engagement element 1460 to lock them together. Compression of the clutch plates 1464, 1468 causes them to rotate together. When the second engagement element actuator relaxes, or releases, the compression, the clutch plates 1464, 1468 rotate with respect to one another. The second engagement element actuator may be such as an electromagnetic actuator, a hydraulic actuator, a pneumatic actuator, or a mechanical actuator. The first and second engagement element actuators work independently of one another.

The gear ratio of the second clutch hub gear 1470 and the second gear 1472 is different from the gear ratio of the first clutch hub gear 1450 and the first gear 1452. In a first speed reduction mode the first engagement element 1440 is closed and the second engagement element 1460 is open. In the first speed reduction mode rotation is provided through the layshaft 1434, through the first engagement element 1440 to the gear ratio defined by the clutch hub gear 1450 and the first gear 1452 on the differential case 1454. In a second speed reduction mode the second engagement element 1460 is closed and the first engagement element 1440 is open. In the second speed reduction mode rotation is provided through the layshaft 1434, through the second engagement element 1460 to the gear ratio defined by the clutch hub gear 1470 and the second gear 1472 on the differential case 1454.

In another embodiment, not depicted, the first and second engagement elements 1440, 1460 may comprise a synchronizer system. In still another embodiment, the first and second engagement elements 1440, 1460 may comprise a first and second dog clutch. The first and second engagement elements 1440, 1460 may be referred to herein as a shift element. In an embodiment, not disposed, a first layshaft gear and a second layshaft gear are disposed on the layshaft 1434. The first layshaft gear is in meshed engagement with the first drive gear 1452, and the second layshaft gear is in meshed engagement with the second drive gear 1472. In a first position, the shift element couples the first layshaft gear with the layshaft 1434 to transfer torque from the layshaft 1434 to the first drive gear 1452. In a second position, the shift element couples the second layshaft gear with the layshaft 1434 to transfer torque from the layshaft 1434 to the second drive gear 1472.

The parking brake 1720 comprises a first portion 1722 coupled with a stationary housing portion of the electric drive axle 1700 and a second portion 1724 coupled with the layshaft 1434. The parking brake first portion 1722 selectively engages the second portion 1724 to mitigate rotation of the layshaft 1434, and therefore the electric drive axle 1700. The parking brake 1720 may comprise any shift element suitable for selectively engaging the stationary housing and the layshaft 1434. In an embodiment, the parking brake 1720 may comprise a multi-plate clutch. In another embodiment, the parking brake 1720 may comprise a dog clutch.

It is also an object of the present disclosure to provide the following:

An electric drive axle, comprising:
a first axle shaft;
a second axle shaft coaxial with said first axle shaft;
a differential apparatus having a differential case, wherein said differential apparatus operatively connects said first and second axle shafts;
an electric motor having a stator and a rotor disposed concentrically with said first axle shaft;
a driving shaft coupled for rotation with said rotor and disposed concentrically with said first axle shaft;
a first planetary gear set comprising:
   a first sun gear coupled with said driving shaft;
   a first plurality of planet gears in meshed engagement with said first sun gear;
   a first carrier concentrically disposed about said first axle shaft, wherein said first plurality of planet gears are rotatably supported thereon; and
   a first ring gear in meshed engagement with at least one of said first plurality of planet gears;
a second planetary gear set disposed coaxial with said first axle shaft, comprising:
   a second plurality of planet gears in meshed engagement with a second sun gear;
   a second carrier coaxially disposed with said first axle shaft, wherein said second plurality of planet gears are rotatably supported thereon; and
   a second ring gear in meshed engagement with at least one of said second plurality of planet gears.

The electric drive axle, wherein:
said second sun gear is coupled with said first carrier.

The electric drive axle, further comprising:
a driven shaft coupled with said first carrier and disposed concentrically about said first axle shaft, wherein said second sun gear is coupled with said driven shaft.

The electric drive axle, wherein:
said second sun gear is coupled for rotation with said first axle shaft adjacent to a wheel end.

The electric drive axle, wherein:
said second carrier is coupled with said differential case.

The electric drive axle, further comprising:
a first engagement element, comprising:
   a first portion coupled with said first carrier; and
   a second portion coupled with said second carrier;
   said first engagement element having a first position wherein said first portion and said second portion are disengaged;
   said first engagement element having a second position wherein said first portion and said second portion are engaged such that said first and second carriers are coupled for rotation;
a second engagement element coupled with an axle housing;
   said second engagement element having a first position wherein said second engagement element is engaged with said second ring gear such that said second ring gear does not rotate; and
   said second engagement element having a second position wherein said second engagement element is disengaged from said second ring gear such that said second ring gear is rotatable.

The electric drive axle, further comprising:
a third planetary gear set disposed concentrically about said first axle shaft, comprising:
   a third sun gear coupled with said second carrier;
   a third plurality of planet gears in meshed engagement with said third sun gear;
   a third carrier, wherein said third plurality of planet gears are rotatably supported thereon; and
   a third ring gear in meshed engagement with at least one of said third plurality of planet gears.

The electric drive axle, wherein:
said third carrier is coupled with said differential case; and
said third ring gear is connected to ground.

The electric drive axle, wherein:
said third carrier is connected to ground; and
said third ring gear is coupled with said differential case.

An electric drive axle, comprising:
a first axle shaft;
a second axle shaft coaxial with said first axle shaft;
a differential apparatus having a differential case, wherein said differential apparatus operatively connects said first and second axle shafts;
an electric motor having a stator and a rotor disposed concentrically with said first axle shaft;
a driving shaft coupled for rotation with said rotor and disposed concentrically about said first axle shaft;
a driving gear coupled with said driving shaft;
a layshaft disposed parallel with said first axle shaft;
a first driven gear coupled with said layshaft and meshed with said driving gear;
a planetary gear set, comprising:
   a sun gear coupled with said layshaft;
   a plurality of planet gears, wherein at least one of said plurality of planet gears is in meshed engagement with said sun gear;
   a carrier, wherein said plurality of planet gears are rotatably supported on said carrier;
   a planetary ring gear, wherein said planetary ring gear is in meshed engagement with at least one of said plurality of planet gears;

a second driven gear disposed on a driven shaft disposed coaxially with said layshaft, wherein said driven shaft is operatively driven by said plurality of planet gears; and
a drive gear coupled with said differential case and meshed with said second driven gear.

The electric drive axle, wherein:
said carrier is coupled with said driven shaft.

The electric drive axle, further comprising:
a first engagement element, comprising:
  a first portion coupled with said carrier; and
  a second portion coupled with said layshaft, whereby said first engagement element selectively couples said layshaft and said carrier; and
a second engagement element coupled with an axle housing, wherein said second engagement element selectively couples said planetary ring gear with said axle housing.

The electric drive axle, wherein said plurality of planet gears comprises:
a first set of planet gears in meshed engagement with said sun gear; and
a second set of planet gears disposed axially adjacent to said first set of planet gears, wherein said second set of planet gears is in meshed engagement with said planetary ring gear.

The electric drive axle, wherein said plurality of planet gears comprises:
a first set of planet gears in meshed engagement with said sun gear; and
a second set of planet gears disposed radially adjacent to said first set of planet gears, wherein said second set of planet gears is in meshed engagement with said first set of planet gears.

The electric drive axle, further comprising:
a first engagement element, comprising:
  a first portion coupled with said carrier; and
  a second portion coupled with said layshaft, whereby said first engagement element selectively couples said layshaft and said carrier;
a second engagement element coupled with an axle housing, wherein said second engagement element selectively couples said carrier with said axle housing; and
wherein said planetary ring gear is coupled for rotation with said driven shaft.

The electric drive axle, further comprising:
a third driven gear disposed on said driven shaft;
a second drive gear coupled with said differential case and meshed with said third driven gear;
a first engagement element coupled with said driven shaft, wherein said first engagement element selectively couples said driven shaft with said second driven gear; and
a second engagement element coupled with said driven shaft, wherein said second engagement element selectively couples said driven shaft with said third driven gear.

An electric drive axle, comprising:
a first axle shaft;
a second axle shaft coaxial with said first axle shaft;
a differential apparatus having a differential case, wherein said differential apparatus operatively connects said first and second axle shafts;
an electric motor having a stator and a rotor disposed concentrically with said first axle shaft;
a driving shaft coupled for rotation with said rotor and disposed concentrically with said first axle shaft;
a planetary gear set comprising:
  a sun gear coupled with said driving shaft;
  a plurality of planet gears in meshed engagement with said sun gear;
  a carrier concentrically disposed about said first axle shaft, wherein said plurality of planet gears are rotatably supported thereon; and
  a ring gear in meshed engagement with at least one of said plurality of planet gears;
a first driven gear disposed on said carrier;
a layshaft disposed offset from said first axle shaft;
a second driven gear coupled with said layshaft and in meshed engagement with said first driven gear; and
a third driven gear disposed on said layshaft in meshed engagement with a first drive gear coupled with said differential case.

The electric drive axle, further comprising:
a fourth driven gear disposed on said layshaft;
a second drive gear coupled with said differential case and in meshed engagement with said fourth driven gear; and
a shift element having a first position wherein said third driven gear is coupled for rotation with said layshaft, and a second position wherein said fourth driven gear is coupled for rotation with said layshaft.

The electric drive axle, further comprising:
a first clutch drum coupled with said layshaft;
a first clutch hub rotatably disposed about said layshaft comprising said third driven gear, wherein said first clutch hub is selectively engaged with said first clutch drum via a first actuation mechanism;
a second clutch drum coupled with said layshaft;
a second clutch hub rotatably disposed about said layshaft comprising a fourth driven gear, wherein said second clutch hub is selectively engaged with said second clutch drum via a second actuation mechanism; and
a second drive gear coupled with said differential case and in meshed engagement with said fourth driven gear.

The electric drive axle, further comprising:
a driven shaft coupled with said carrier;
a first clutch drum coupled with said driven shaft; a first clutch hub rotatably disposed about said driven shaft, wherein said first driven gear comprises a first hub gear of the first clutch hub;
a first actuation mechanism, whereby said first clutch hub is selectively engaged with said first clutch drum;
a second clutch drum coupled with said driven shaft;
a second clutch hub rotatably disposed about said driven shaft comprising a second hub gear, wherein said second clutch hub is selectively engaged with said second clutch drum via a second actuation mechanism; and
a fourth driven gear coupled with said layshaft and in meshed engagement with said second hub gear.

The electric drive axle, further comprising:
a driven shaft coupled with said carrier, wherein said first driven gear is disposed thereon;
a fourth driven gear disposed on said driven shaft;
a fifth driven gear coupled for rotation with said layshaft; and
a shift element having a first position wherein said first driven gear is coupled for rotation with said driven shaft, and a second position wherein said fifth driven gear is coupled for rotation with said driven shaft.

An electric drive axle, comprising:
a first axle shaft;
a second axle shaft coaxial with said first axle shaft;
a differential apparatus having a differential case, wherein said differential apparatus operatively connects said first and second axle shafts;
an electric motor having a stator and a rotor;
a driving shaft coupled for rotation with said rotor disposed concentrically with said first axle shaft;
a driving gear disposed on said driving shaft;
a layshaft disposed parallel with said first axle shaft;
a first layshaft gear coupled with said layshaft and meshed with said driving gear;
a second layshaft gear disposed on said layshaft;
a driven shaft concentrically disposed about said first axle shaft, comprising:
a first driven gear meshed with said second layshaft gear, and
a sun gear;
a planetary gear set comprising:
a plurality of planet gears in meshed engagement with said sun gear;
a carrier coupled with said differential case, wherein said plurality of planet gears are rotatably supported thereon; and
a planetary ring gear in meshed engagement with at least one of said plurality of planet gears.
The electric drive axle, further comprising:
a first gear rotatably disposed about said layshaft;
a second driven gear disposed on said driven shaft and in meshed engagement with said first gear;
wherein said second layshaft gear comprises a second gear rotatably disposed about said layshaft; and
a shift element having a first position wherein said first gear is coupled for rotation with said layshaft, and a second position wherein said second gear is coupled for rotation with said layshaft.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. An electric drive axle, comprising:
a first axle shaft;
a second axle shaft coaxial with said first axle shaft;
a differential apparatus having a differential case, wherein said differential apparatus operatively connects said first and second axle shafts;
an electric motor having a stator and a rotor;
a driving shaft coupled for rotation with said rotor disposed parallel with said first axle shaft;
a first driving gear disposed on said driving shaft;
a driven shaft having a first driven gear and a second driven gear, wherein said first driven gear meshes with said first driving gear;
a layshaft disposed parallel with said first axle shaft;
a first layshaft gear coupled with said layshaft and meshed with said second driven gear;
a second layshaft gear disposed on said layshaft;
a first drive gear coupled with said differential case and in meshed engagement with said second layshaft gear;
a third driven gear coupled with said driven shaft;
a second driving gear disposed on said driving shaft and in meshed engagement with said third driven gear; and
a shift element having a first position wherein said first driving gear is coupled for rotation with said driving shaft, and a second position wherein said second driving gear is coupled for rotation with said driving shaft.

2. The electric drive axle of claim 1, wherein:
said driven shaft is disposed concentrically about said first axle shaft.

3. The electric drive axle of claim 1, wherein:
said electric motor is radially offset from said first and second axle shafts.

4. The electric drive axle of claim 1, further comprising:
a first clutch drum coupled with said driving shaft;
a first clutch hub rotatably disposed about said driving shaft, wherein said first driving gear comprises a first hub gear of said first clutch hub;
a first actuation mechanism, whereby said first clutch hub is selectively engaged with said first clutch drum;
a second clutch drum coupled with said driving shaft;
a second clutch hub rotatably disposed about said driving shaft comprising a second hub gear, wherein said second clutch hub is selectively engaged with said second clutch drum via a second actuation mechanism; and
a third driven gear coupled with said driven shaft and in meshed engagement with said second hub gear.

5. The electric drive axle of claim 1, further comprising:
a third layshaft gear disposed on said layshaft;
a second drive gear coupled with said differential case and in meshed engagement with said third layshaft gear; and
a shift element having a first position wherein said second layshaft gear is coupled for rotation with said layshaft, and a second position wherein said third layshaft gear is coupled for rotation with said layshaft.

6. The electric drive axle of claim 1, further comprising:
a first clutch drum coupled with said layshaft;
a first clutch hub rotatably disposed about said layshaft, wherein said second layshaft gear comprises a first hub gear of said first clutch hub;
a first actuation mechanism, whereby said first clutch hub is selectively engaged with said first clutch drum;
a second clutch drum coupled with said layshaft;
a second clutch hub rotatably disposed about said layshaft comprising a second hub gear, wherein said second clutch hub is selectively engaged with said second clutch drum via a second actuation mechanism; and
a second drive gear coupled with said differential case and in meshed engagement with said second hub gear.

7. An electric drive axle, comprising:
a first axle shaft;
a second axle shaft coaxial with said first axle shaft;
a differential apparatus having a differential case, wherein said differential apparatus operatively connects said first and second axle shafts;
an electric motor having a stator and a rotor;
a driving shaft coupled for rotation with said rotor disposed parallel with said first axle shaft;
a first driving gear disposed on said driving shaft;
a driven shaft having a first driven gear and a second driven gear, wherein said first driven gear meshes with said first driving gear;
a layshaft disposed parallel with said first axle shaft;
a first layshaft gear coupled with said layshaft and meshed with said second driven gear;
a second layshaft gear disposed on said layshaft;

a first drive gear coupled with said differential case and in meshed engagement with said second layshaft gear; and a parking brake having a first portion coupled with an axle housing portion and a second portion coupled with said layshaft, wherein said parking brake selectively engages said layshaft and said axle housing portion.

8. The electric drive axle of claim 7, wherein:
said driven shaft is disposed concentrically about said first axle shaft.

9. The electric drive axle of claim 7, wherein:
said electric motor is radially offset from said first and second axle shafts.

10. The electric drive axle of claim 7, further comprising:
a third driven gear coupled with said driven shaft;
a second driving gear disposed on said driving shaft and in meshed engagement with said third driven gear; and
a shift element having a first position wherein said first driving gear is coupled for rotation with said driving shaft, and a second position wherein said second driving gear is coupled for rotation with said driving shaft.

11. The electric drive axle of claim 7, further comprising:
a first clutch drum coupled with said driving shaft;
a first clutch hub rotatably disposed about said driving shaft, wherein said first driving gear comprises a first hub gear of said first clutch hub;
a first actuation mechanism, whereby said first clutch hub is selectively engaged with said first clutch drum;
a second clutch drum coupled with said driving shaft;
a second clutch hub rotatably disposed about said driving shaft comprising a second hub gear, wherein said second clutch hub is selectively engaged with said second clutch drum via a second actuation mechanism; and
a third driven gear coupled with said driven shaft and in meshed engagement with said second hub gear.

12. The electric drive axle of claim 7, further comprising:
a third layshaft gear disposed on said layshaft;
a second drive gear coupled with said differential case and in meshed engagement with said third layshaft gear; and
a shift element having a first position wherein said second layshaft gear is coupled for rotation with said layshaft, and a second position wherein said third layshaft gear is coupled for rotation with said layshaft.

13. The electric drive axle of claim 7, further comprising:
a first clutch drum coupled with said layshaft;
a first clutch hub rotatably disposed about said layshaft, wherein said second layshaft gear comprises a first hub gear of said first clutch hub;
a first actuation mechanism, whereby said first clutch hub is selectively engaged with said first clutch drum;
a second clutch drum coupled with said layshaft;
a second clutch hub rotatably disposed about said layshaft comprising a second hub gear, wherein said second clutch hub is selectively engaged with said second clutch drum via a second actuation mechanism; and
a second drive gear coupled with said differential case and in meshed engagement with said second hub gear.

14. An electric drive axle, comprising:
a first axle shaft;
a second axle shaft coaxial with said first axle shaft;
a differential apparatus having a differential case, wherein said differential apparatus operatively connects said first and second axle shafts;
an electric motor having a stator and a rotor;
a driving shaft coupled for rotation with said rotor disposed parallel with said first axle shaft;
a first driving gear disposed on said driving shaft;
a driven shaft having a first driven gear and a second driven gear, wherein said first driven gear meshes with said first driving gear;
a layshaft disposed parallel with said first axle shaft;
a first layshaft gear coupled with said layshaft and meshed with said second driven gear;
a second layshaft gear disposed on said layshaft; and
a first drive gear coupled with said differential case and in meshed engagement with said second layshaft gear;
a third layshaft gear disposed on said layshaft;
a second drive gear coupled with said differential case and in meshed engagement with said third layshaft gear; and
a shift element having a first position wherein said second layshaft gear is coupled for rotation with said layshaft, and a second position wherein said third layshaft gear is coupled for rotation with said layshaft.

15. The electric drive axle of claim 14, wherein:
said driven shaft is disposed concentrically about said first axle shaft.

16. The electric drive axle of claim 14, wherein:
said electric motor is radially offset from said first and second axle shafts.

17. The electric drive axle of claim 14, further comprising:
a third driven gear coupled with said driven shaft;
a second driving gear disposed on said driving shaft and in meshed engagement with said third driven gear; and
a shift element having a first position wherein said first driving gear is coupled for rotation with said driving shaft, and a second position wherein said second driving gear is coupled for rotation with said driving shaft.

18. The electric drive axle of claim 14, further comprising:
a first clutch drum coupled with said driving shaft;
a first clutch hub rotatably disposed about said driving shaft, wherein said first driving gear comprises a first hub gear of said first clutch hub;
a first actuation mechanism, whereby said first clutch hub is selectively engaged with said first clutch drum;
a second clutch drum coupled with said driving shaft;
a second clutch hub rotatably disposed about said driving shaft comprising a second hub gear, wherein said second clutch hub is selectively engaged with said second clutch drum via a second actuation mechanism; and
a third driven gear coupled with said driven shaft and in meshed engagement with said second hub gear.

* * * * *